United States Patent
Yamanaka et al.

(10) Patent No.: US 10,330,195 B2
(45) Date of Patent: Jun. 25, 2019

(54) INPUT DEVICE

(71) Applicants: PANASONIC CORPORATION, Osaka (JP); FICO TRIAD, S.A., Barcelona (ES)

(72) Inventors: Seigo Yamanaka, Fukui (JP); David Tuset Danis, Barcelona (ES); Narcis Pallares Mullet, Barcelona (ES)

(73) Assignees: PANASONIC CORPORATION, Osaka (JP); FICO TRIAD, S.A., Barcelona (ES)

( * ) Notice: Subject to any disclaimer, the term of this patent is extended or adjusted under 35 U.S.C. 154(b) by 184 days.

(21) Appl. No.: 15/634,769

(22) Filed: Jun. 27, 2017

(65) Prior Publication Data
US 2018/0372216 A1  Dec. 27, 2018

(51) Int. Cl.
| | |
|---|---|
| F16H 61/24 | (2006.01) |
| F16H 59/08 | (2006.01) |
| B60K 20/02 | (2006.01) |
| G05G 1/015 | (2008.04) |
| G05G 5/03 | (2008.04) |
| B60K 20/08 | (2006.01) |
| G05G 1/08 | (2006.01) |

(52) U.S. Cl.
CPC ............ *F16H 61/24* (2013.01); *B60K 20/02* (2013.01); *F16H 59/08* (2013.01); *G05G 1/015* (2013.01); *G05G 5/03* (2013.01); *B60K 20/08* (2013.01); *F16H 2059/081* (2013.01); *F16H 2061/243* (2013.01); *G05G 1/08* (2013.01)

(58) Field of Classification Search
None
See application file for complete search history.

(56) References Cited

U.S. PATENT DOCUMENTS

| | | | | |
|---|---|---|---|---|
| 2004/0231434 | A1* | 11/2004 | Shibazaki | B60K 37/06 73/862.08 |
| 2007/0279401 | A1* | 12/2007 | Ramstein | G06F 3/016 345/184 |
| 2009/0000407 | A1 | 1/2009 | Meyer et al. | |
| 2009/0000413 | A1 | 1/2009 | Furhoff et al. | |
| 2011/0181405 | A1* | 7/2011 | Periquet | F16F 9/535 340/407.2 |
| 2015/0027861 | A1* | 1/2015 | Hoskins | F16H 59/08 200/43.11 |

FOREIGN PATENT DOCUMENTS

| | | |
|---|---|---|
| WO | 2006/021198 | 3/2006 |
| WO | 2007/076814 | 7/2007 |

* cited by examiner

*Primary Examiner* — Timothy Hannon
(74) *Attorney, Agent, or Firm* — Seed IP Law Group LLP

(57) ABSTRACT

An input device is equipped with an operation member that is capable of performing an operation by a hand of an operator; a braking unit configured to brake a movement of the operation member; a speed determiner configured to determine a current speed of the operation member; and a controller configured to cause the braking unit to brake the movement of the operation member in response to the current speed of the operation member.

19 Claims, 14 Drawing Sheets

TOP

INPUT DEVICE

BACKGROUND OF THE INVENTION

1. Field of the Invention

The present disclosure relates to an input device which can operate an operation target such as an electronic apparatus or a vehicle when an operation member such as a knob is moved by a hand of an operator.

2. Description of the Related Art

Input devices are known which can perform an operation relating to a function or a movement of an operation target, such as an electronic apparatus or a vehicle, connected to a rotatable knob when the knob is appropriately rotated by, for example, a hand of an operator. For example, WO2006/021198 A1 and WO2007/076814 A1 are respectively proposed as the prior art relating to such input devices.

WO2006/021198 A1 discloses an operation device for, for example, a shift-by-wire vehicular transmission. Stoppers are provided at two locations to restrict the rotation angle of a rotary knob as an example of an operation member and a vehicular automatic transmission is switched according to rotation of the rotary knob.

WO2007/076814 A1 discloses a shift device for shifting of, for example, a vehicular transmission. When an operation element as an example of an operation member is rotated, an actuator outputs torque to a shaft or torque that counteracts rotation of the shaft, whereby the vehicular transmission is switched to an intended shift position of the vehicle.

However, in the prior art techniques as disclosed in WO2006/021198 A1 and WO2007/076814 A1, if an operator rotates the operation member such as a knob with, for example, finger tips in such a manner as to move it abruptly and strongly to give it an excessive initial speed, the following trouble may occur.

For example, where stoppers are provided as in WO2006/021198 A1 if the rotary knob is rotated faster than a predetermined rotation speed assumed at the time of designing, the rotary knob may stop at a different position from a stop target position (e.g., P gear position) intended by the operator because the rotary knob rebounds from a stopper, for example. This means a problem that it is difficult to switch the position of the rotary knob stably to a stop target position intended by an operator.

Even where no stoppers are provided as in WO2007/076814 A1, if the rotary knob is rotated faster than a predetermined rotation speed assumed at the time of designing, a phenomenon may occur that torque for counteracting shaft rotation is not generated in time and the rotary knob passes a stop target position (e.g., P gear position) intended by the operator and stops at a different position from the stop target position. This also means a problem that it is difficult to switch the position of the operation element stably to a stop target position intended by an operator.

Further, when plural positions for setting gear positions of a transmission of a vehicle are linearly disposed and the operator sets the gear position by performing a linearly back and forth movement of the operation member in order to alter the gear position other than performing a rotational operation of the operation member, the following trouble may happen. For example, when the operator tries to moves the operation member directly from a D gear position to a R gear position while the vehicle is running, a shifter needs to have a mechanical stopper to prevent from the R gear position entering. The trouble that the operator needs to perform a redundant operation to set the R gear position may happen.

SUMMARY OF THE INVENTION

The present disclosure has been made in the above circumstances of the prior art, and an object of the disclosure is therefore to provide an input device capable of switching an operation member such as a movable knob stably to a stop target position intended by an operator even in a case that the operator moves the operation member in such a manner as to move it abruptly with fingertips to give it a large initial speed, and thereby enabling support of safe use of an operation target. The knob movement may be either straight, rotative or a combination of a straight movement and a rotative movement.

First embodiment of the disclosure provides an input device having an operation member that is capable of performing an operation by a hand of an operator; a braking unit configured to brake a movement of the operation member; a speed determiner configured to determine a current speed of the operation member; and a controller configured to cause the braking unit to brake the movement of the operation member in response to the current speed of the operation member.

Second embodiment of the disclosure provides a vehicle having the input device.

Third embodiment of the disclosure provides a control method of an input device including determining a current speed of an operation member that is capable of performing an operation by a hand of an operator, and braking a movement of the operation member in response to the current speed of the operation member.

According to the disclosure, the operation member such as a movable knob can be switched stably to a stop target position intended by an operator even in a case that the operator moves the operation member in such a manner as to move it abruptly with fingertips to give it a large initial speed, whereby support of safe use of an operation target is enabled.

DETAILED DESCRIPTION OF THE PREFERRED EMBODIMENTS

Figure 1:
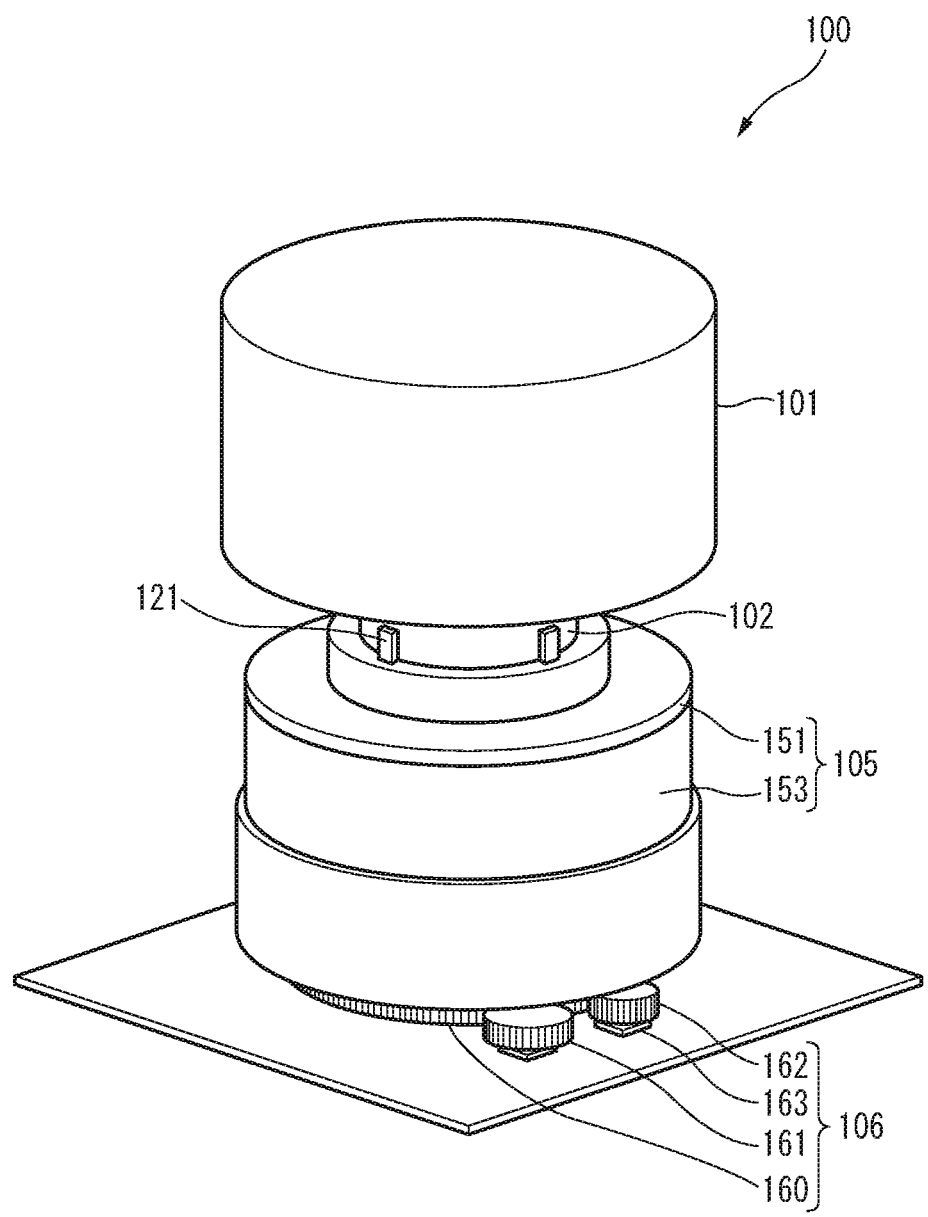
FIG. 1 is a perspective view of an input device according to a first embodiment.

Input devices according to specific embodiments of the present disclosure will be hereinafter described in detail with reference to the drawings. However, unnecessarily detailed descriptions will be avoided. For example, a detailed description of a well-known matter or a redundant description of a substantially identical structure may be avoided. This is to avoid rendering a related description unduly lengthy and to thereby facilitate understanding by those skilled in the art. The following description and the accompanying drawings are provided to allow those skilled in the art to understand the disclosure sufficiently and should not be construed as restricting the scope of the claims.

The drawings are schematic ones in which emphasis, omission, ratio adjustments may be made to facilitate understanding of the structures of input devices according to the disclosure. Thus, shapes, positional relationship, and ratios between dimensions in the drawings may be different from actual ones.

Embodiment 1

FIG. 1 is a perspective view of an input device 100 according to a first embodiment.

Figure 2:
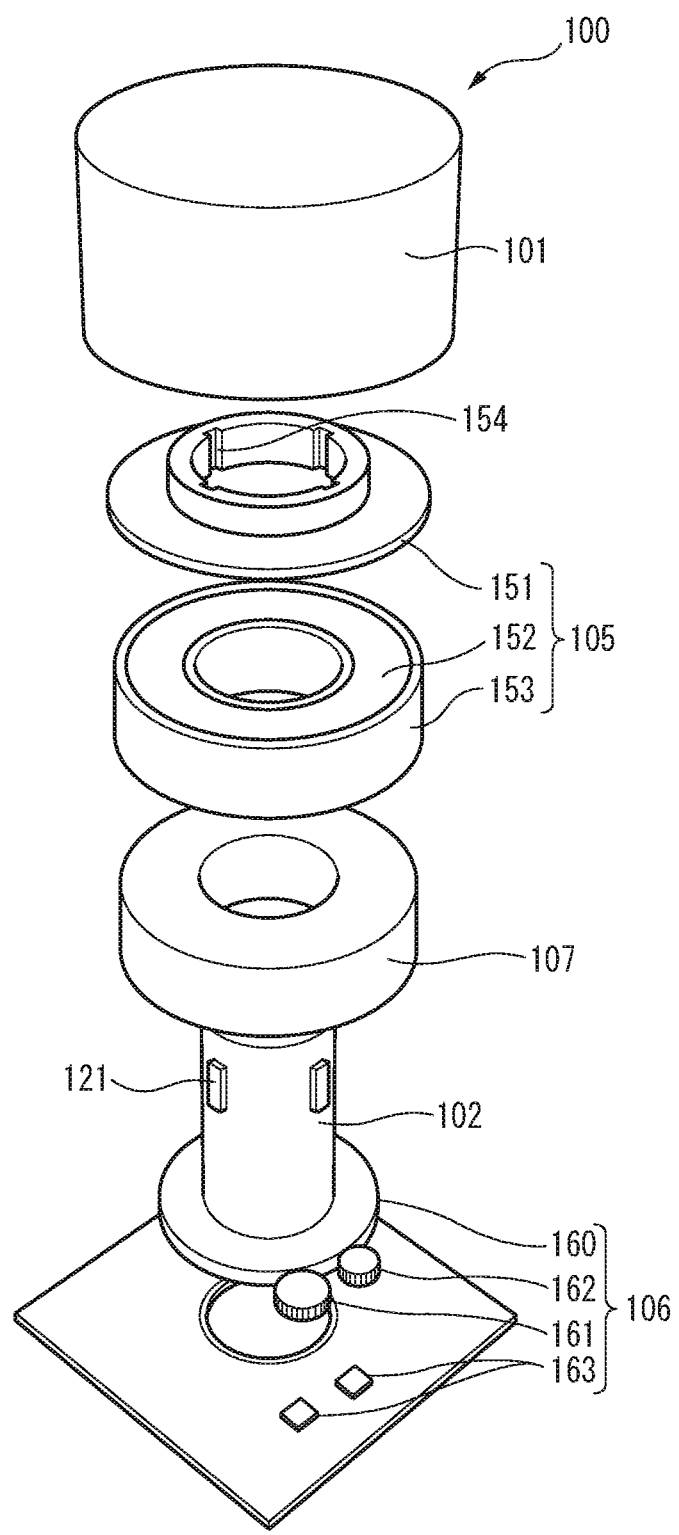
FIG. 2 is an exploded perspective view of the input device according to the first embodiment.

FIG. 2 is an exploded perspective view of the input device 100 according to the first embodiment.

Figure 3:
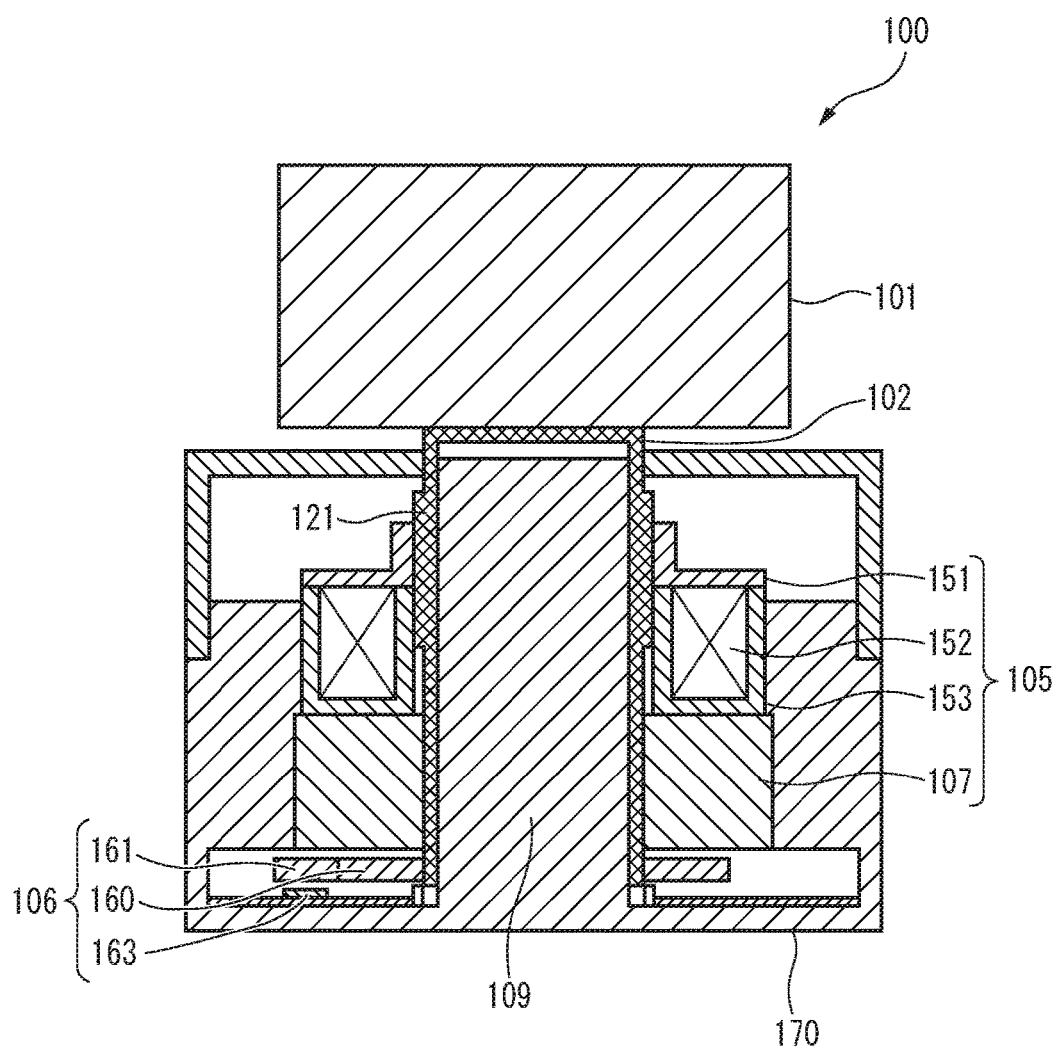
FIG. 3 is a sectional view illustrating an example of a cross section of the input device according to the first embodiment.

FIG. 3 is a sectional view illustrating an example of a cross section of the input device 100 according to the first embodiment.

Figure 4:
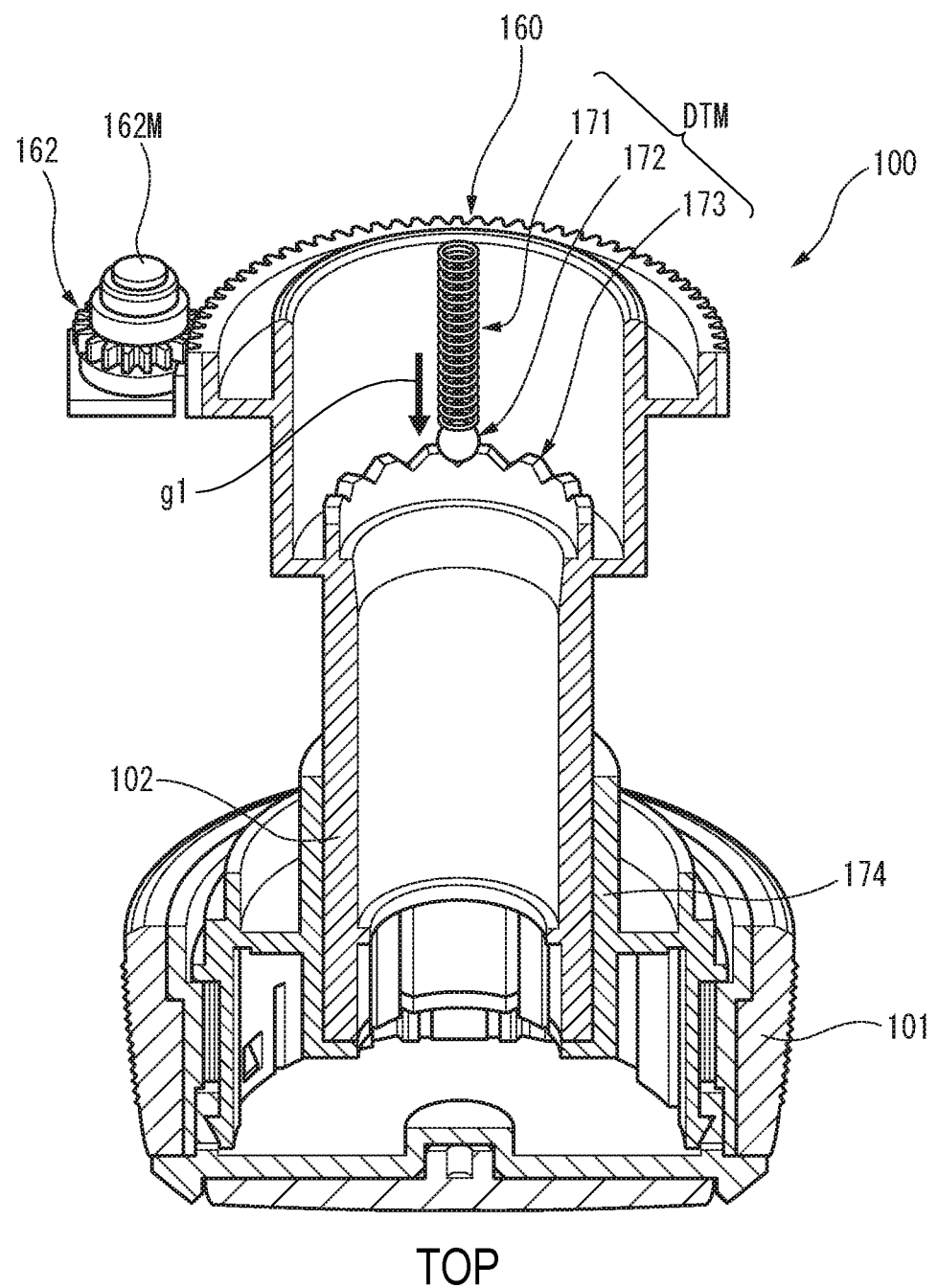
FIG. 4 is a sectional view illustrating an example of an essential part of a mechanical detent mechanism of the input device according to the first embodiment.

FIG. 4 is a sectional view illustrating an example of an essential part of a mechanical detent mechanism DTM of the input device 100 according to the first embodiment.

Figure 5:
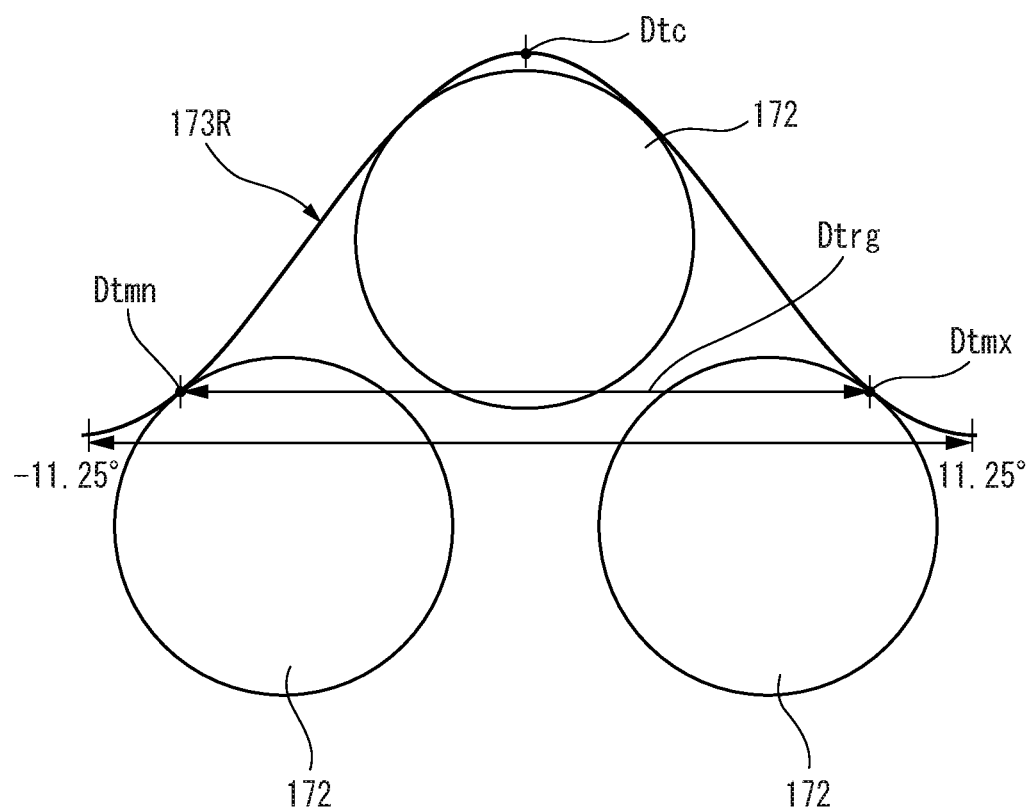
FIG. 5 is a diagram illustrating an example of detent range of the mechanical detent mechanism of the input device according to the first embodiment.

FIG. 5 is a diagram illustrating an example of detent range Dtrg of the mechanical detent mechanism DTM of the input device 100 according to the first embodiment.

Figure 6:
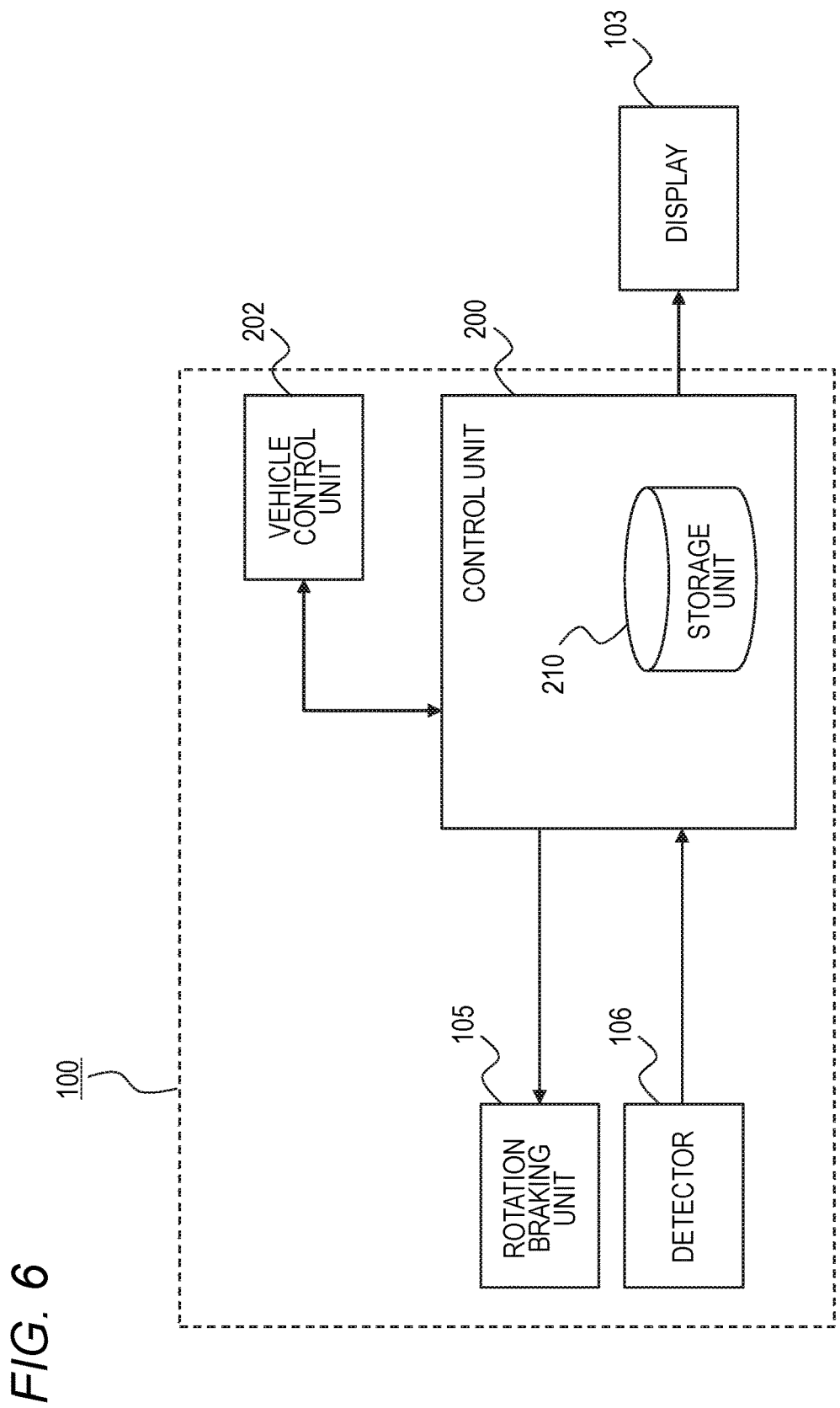
FIG. 6 is a block diagram illustrating an example of functional units and mechanical units of the input device according to the first embodiment.

FIG. 6 is a block diagram illustrating an example of functional units and mechanical units of the input device 100 according to the first embodiment.

As shown in FIGS. 1-3 respectively, the input device 100 is a device capable of inputting a signal corresponding to a rotating operation made by, for example, a hand of an operator to an operation target such as an electronic apparatus or a vehicle. The input device 100 is equipped with a knob 101, a rotary shaft 102, a rotation braking unit 105, and a detector 106 as mechanical members and units of the input device 100. The input device 100 is equipped with a controller 200 (including a storage 210) and a vehicle controller 202 as functional units of the input device 100. The information that the vehicle controller 202 acquired from the vehicle could be received by the controller 200 through the CAN (Controller Area Network) data bus. The input device 100 is also equipped with an operation force applying unit 107, a fixed shaft 109 (see FIG. 3), and a body 170 (see FIG. 3). The input device 100 may also be equipped with a display 103.

The knob 101 as an example of an operation member is a member that is held by the rotary shaft 102 (described later). The knob 101 is capable of performing a rotating operation in a range of 360° or more in a desired manner by holding it with his or her hand. In the embodiment, the knob 101 is shaped like a cylinder in which the length is equal to or shorter than the diameter. The outer circumferential surface of the knob 101 is inscribed with a knurled pattern (not shown) to prevent fingers of an operator from slipping in performing a rotating operation on the knob 101.

The display 103 is disposed in the vicinity of the outer circumference of the knob 101. The display 103 is equipped with display portions 103A which are alphabetical characters and a number and indicate gear positions of a vehicle transmission, respectively, and indicators 103B such as LEDs (light-emitting diodes) which are disposed outside and in the vicinity of the respective display portions 103A. The controller 200 causes an indicator 103B of the display 103 to light according to a rotating operation on the knob 101, whereby an operator (e.g., driver) can visually recognize a rotation position of the knob 101.

The material of the knob 101 may be any of various materials such as a metal and a resin. The external shape of the knob 101 is not limited to a cylindrical shape and may be any shape such as a star shape.

Instead of being provided in the input device 100, the indicator 103 may be provided on the top surface of a member on which the input device 100 is mounted, or provided on the same knob 101 directly.

The rotary shaft 102 is a rod-like member which is connected to the knob 101 and rotates together with it when it is rotated by a hand of an operator. In the embodiment, the rotary shaft 102 is disposed coaxially with the knob 101 and holds it so as to be detachable from it. As shown in FIG. 3, the rotary shaft 102 is shaped like a hollow cylinder that is coaxial with and fitted with the fixed shaft 109 which is erected from the body 170. Thus, the rotary shaft 102 can rotate about the fixed shaft 109 by 360° or more in a desired manner. The outer circumferential surface of the rotary shaft 102 is formed with, at, for example, four positions on a circumference at equal intervals, first projections 121 which project in radial directions and extend parallel with the axis of the rotary shaft 102.

There no particular limitations on the material of the rotary shaft 102. However, where the rotation braking unit 105, the detector 106, or the operation force applying unit 107 (all of them will be described later) functions using a magnetic force, the rotary shaft 102 may be made of a resin.

The rotation braking unit 105 is a device capable of permitting or prohibiting rotation of the knob 101 about the fixed shaft 109 according to a control signal (described later) that is output from the controller 200. Furthermore, the rotation braking unit 105 serves as an electromagnetic brake capable of braking rotation of the knob 101 about the fixed shaft 109 by applying a braking force to the rotary shaft 102.

In the embodiment, as shown in FIGS. 2 and 3, the rotation braking unit 105 is composed of an armature 151, an electromagnet 152, and a yoke 153 and permits, prohibits or brakes rotation of the knob 101 according to a control signal that is output from the controller 200.

More specifically, the rotation braking unit 105 prohibits rotation of the rotary shaft 102 (in other words, rotation of the knob 101) by causing the armature 151 and the yoke 153 to be connected to each other strongly using, for example, an electromagnetic force that is generated by power supplied to the electromagnet 152, according to a control signal that is output from the controller 200. The rotation braking unit 105 can vary the braking force to act on the armature 151 rotating about the yoke 153 by adjusting the electromagnetic force generated by the electromagnet 152 by, for example, adjusting the power (more specifically, the duty ratio of a PWM control (described later)) supplied to the electromagnet 152, according to a control signal that is output from the controller 200.

The armature 151 is a member that is attached to the outer circumferential surface of the rotary shaft 102 from outside.

In the embodiment, the armature 151 is shaped like a circular ring and its inner circumferential surface is formed with grooves 154 at equal intervals at four such positions on a circumference as to be fitted with the respective first projections 121 of the rotary shaft 102. In the circumferential direction of the rotary shaft 102, the width of the grooves 154 is approximately equal to that of the first projections 121 and hence the grooves 154 are fitted with the respective first projections 121 with almost no play. On the other hand, in the axial direction of the rotary shaft 102, the grooves 154 and the first projections 121 allow the rotary shaft 102 to slip on the armature 151; even when the rotary shaft 102 is moved in its axial direction, the positional relationship in the circumferential direction between the rotary shaft 102 and the armature 151 does not vary.

The armature 151 is made of a magnetic material. When the rotation braking unit 105 supplies the electromagnet 152 with power that is larger than or equal to an upper threshold value according to a control signal that is output from the controller 200, the armature 151 and the yoke 153 are connected to each other strongly (i.e., fixed to each other). In this manner, the rotation braking unit 105 (electromagnetic brake) brakes rotation of the knob 101 and finally stops it.

On the other hand, when the rotation braking unit 105 supplies the electromagnet 152 with power that is smaller than or equal to a lower threshold value (including power shutoff) according to a control signal that is output from the controller 200, the fixing of the armature 151 and the yoke 153 is canceled. In this manner, the rotation braking unit 105 (electromagnetic brake) cancels the braking of the rotation of the knob 101, whereupon the knob 101 is allowed to rotate by performing a rotating operation on the knob 101 with his or her hand, for example.

When the rotation braking unit 105 supplies the electromagnet 152 with power that is between the upper threshold value and the lower threshold value according to a control signal that is output from the controller 200, the braking force produced by the armature 151 and the yoke 153 can be adjusted. In this manner, the rotation braking unit 105 (electromagnetic brake) establishes a state that a proper braking force is acting on the rotating knob 101, whereby the rotation of the knob 101 is slowed gradually. A specific example of the material of the armature 151 is iron.

An alternative structure is possible that the rotary shaft 102 is formed with grooves that are recessed in radial directions and extend parallel with the axis of the rotary shaft 102 and the armature 151 is formed with corresponding projections.

The electromagnet 152 is a coil (i.e., a winding of a wire) that is disposed outside the outer circumferential surface of the rotary shaft 102. The magnetic force generated by the electromagnet 152 can be varied according to the power that is supplied externally. In the embodiment, the electromagnet 152 is shaped like a circular ring formed around the rotary shaft 102 and is housed in the yoke 153.

The yoke 153 is a member that is disposed outside the outer circumferential surface of the rotary shaft 102 and serves to control a magnetic flux generated by the electromagnet 152. The yoke 153 can prohibit rotation of the rotary shaft 102 via the armature 151 by producing strong friction against the armature 151 by attracting the armature 151 by a strong magnetic force or adjust the torque acting on the armature 151. When the electromagnet 152 generates no magnetic flux, the yoke 153 produces no force for attracting the armature 151, as a result of which almost no friction occurs between the yoke 153 and the armature 151. Thus, rotation of the armature 151 and the rotary shaft 102 is permitted.

There are no particular limitations on the shape of the yoke 153. In the embodiment, the yoke 153 is a ring-shaped container capable of housing the electromagnet 152. The yoke 153 is made of a magnetic material that enables control of a magnetic flux generated by the electromagnet 152. A specific example of the material of the yoke 153 is iron.

The detector 106 is a device for detecting a rotation state of the rotary shaft 102 (in other words, knob 101). The term "rotation state" as used herein means a rotation position, a rotation angle, or the like of the rotary shaft 102. In the embodiment, the detector 106 is composed of a main gear 160, a first gear 161, a second gear 162, and detection elements 163, and serves to detect a rotation position of the rotary shaft 102 (knob 101) repeatedly. More specifically, the detector 106 detects a rotation position of the rotary shaft 102 (knob 101) every predetermined detection cycle (e.g., 1 ms) and outputs a detection result to the controller 200.

The main gear 160 is a spur gear that is attached to the rotary shaft 102 coaxially and rotates together with the rotary shaft 102.

The first gear 161 and the second gear 162 are spur gears that are different from each other in diameter and rotate being in mesh with the main gear 160. Each of the first gear 161 and the second gear 162 is provided with a magnet that allows a detection element 163 associated to each one first gear 161 and second gear 162 to detect its rotation.

Each detection element 163 is an element for detecting rotation of the associated one of the first gear 161 and the second gear 162. In the embodiment, each detection element 163 is equipped with a magnetoresistive element for detecting a movement of the magnet (e.g., a magnet 162M shown in FIG. 4) that is provided in the associated one of the first gear 161 and the second gear 162.

Since each of the two detection elements 163 detects rotation of the associated one of the first gear 161 and the second gear 162 which are in mesh with the main gear 160 and different from each other in diameter, the detector 106 can not only detect a relative rotation state of the rotary shaft 102 via the main gear 160 but also detect an absolute rotation state of the rotary shaft 102, that is, a rotation position of the rotary shaft 102 with respect to the body 170.

The structure of the detector 106 is not limited to the above-described one which includes the main gear 160, the first gear 161, the second gear 162, and the plural detection elements 163; for example, the detector 106 may be any of various detectors, such as a rotary encoder.

The operation force applying unit 107 is a device for producing an operational feeling (e.g., force sense or click feeling) every time the knob 101 is rotated by a prescribed angle (e.g., 22.5°). More specifically, the operation force applying unit 107 is a notch device that has a mechanical detent mechanism DTM (see FIG. 4) and can give, to a hand of an operator, an operational feeling indicating that the knob 101 is located at a certain rotation position when the knob 101 is rotated together with the rotary shaft 102. In FIG. 4, the input device 100 is shown upside down (i.e., the knob 101 is shown at the bottom) and the structure of the mechanical detent mechanism DTM which is disposed inside the rotary shaft 102 is also shown. In FIG. 4, the fixed shaft 109 and the rotation braking unit 105 which are shown in FIG. 3 are omitted.

The mechanical detent mechanism DTM is composed of a spring 171, a ball 172, and a cam surface 173. The spring 171 urges the ball 172 that is placed in a recess (notch) of the cam surface 173 in the direction indicated by arrow g1 (i.e., in the direction from the body 170 to the knob 101). When the knob 101 is rotated by a hand of an operator, the ball 172 produces an operational feeling every prescribed angle (e.g., 22.5°), that is, every time it climbs over an adjoining projection of the cam surface 173 and reaches the next recess while being urged by the spring 171 in the direction indicated by arrow g1. By rotating the knob 101 by the prescribed angle (e.g., 22.5°), the operator can cause movement to a next shift position that corresponds to a gear position of the transmission a vehicle in which the input device 100 is installed. The cam surface 173 is formed at an end portion, opposite to the knob 101, of the rotary shaft 102 over the entire circumference (360°) in such a manner that U-shaped, V-shaped, or sinusoidal projections and recesses, for example, are arranged alternately adjacent to each other.

In the mechanical detent mechanism DTM of the operation force applying unit 107, when the knob 101 is not being rotated, the ball 172 stands still at the center of a recess of the cam surface 173 (i.e., at a detent center Dtc where the ball 172 is most stable) while being urged by the spring 171 in the direction indicated by arrow g1.

Now, referring to FIG. 5, assume that the knob 101 has been rotated by a hand of an operator. FIG. 5 illustrates a relationship between a cam curve 173R showing a specific shape of the cam surface 173 and a detent range Dtrg (i.e., a range where the ball 172 is returned to the detent center Dtc) of the mechanical detent mechanism DTM. A movement of the ball 172 from the center of the recess (detent center Dtc) of the cam curve 173R to the peak position of an adjoining projection corresponds to rotation of about +11.25° or −11.25° of the knob 101.

When the knob 101 is rotated by a hand of an operator, a force acts on the ball 172 against the urging force of the spring 171. When the ball 172 has been moved from the detent center Dtc in such a range as not to pass an upper limit position Dtmx or a lower limit opposition Dtmn of the detent range Dtrg, the ball 172 is returned to the detent center Dtc by the urging force of the spring 171. In this case, the operation force applying unit 107 cannot give the hand of the operator an operational feeling (force sense) corresponding to the rotation of the knob 101.

On the other hand, when the ball 172 has been moved from the detent center Dtc to a position that is outside the upper limit position Dtmx or the lower limit opposition Dtmn of the detent range Dtrg, the ball 172 is at least moved to the next detent center of the cam surface 173. In this case, the operation force applying unit 107 can give the hand of the operator an operational feeling (force sense) corresponding to the rotation of the knob 101.

In the embodiment, when rotation of the knob 101 has caused the ball 172 to move from the detent center Dtc to a position that is outside the upper limit position Dtmx or the lower limit opposition Dtmn of the detent range Dtrg, the ball 172 is at least moved to the center of the next recess (i.e., next detent center) of the cam surface 173. Thus, the operation force applying unit 107 can produce an operational feeling every prescribed angle (e.g., 22.5°).

Alternatively, the operation force applying unit 107 may be such as to produce a notch-passing feeling like the above-described operational feeling (force sense or click feeling) using magnetism, that is, a unit that can control the notch-related feeling (e.g., cause it to change or disappear) by controlling a magnetic state.

The body 170 is a member that is fixed to an operation target apparatus (e.g., electronic apparatus or vehicle) in which the input device 100 according to the embodiment is installed and serves as a positional reference for rotation (or a straight movement caused by a push or a pull) of the knob 101. The body 170 holds the yoke 153 which is part of the rotation braking unit 105 and part of the operation force applying unit 107 fixedly. Furthermore, the detection elements 163 are mounted on the body 170 and the first gear 161 and the second gear 162 are attached to the body 170 rotatably. In the embodiment, the body 170 houses the components other than the knob 101 and a tip portion of the rotary shaft 102.

Next, the function units of the input device 100 according to the embodiment will be described.

The controller 200 is a device that is electrically connected to the rotation braking unit 105 and the detector 106 and serves to control the rotation braking unit 105 on the basis of information received from the detector 106. Individual processing units can be implemented by running programs stored in the storage 210 in advance using data that are also stored in the storage 210 in advance.

The controller 200 serves as a rotation speed calculation unit (a term used in the claims). Serving as the rotation speed calculation unit, the controller 200 calculates a current rotation speed of the knob 101 on the basis of a current rotation position of the rotary shaft 102 (in other words, a current rotation position of the knob 101) detected by, for example, the detector 106 and a rotation position of the rotary shaft 102 (in other words, a rotation position of the knob 101) detected last time.

The controller 200 causes the rotation braking unit 105 to brake (dampen) rotation of the knob 101 according to the calculated current rotation speed of the knob 101. More specifically, when the current rotation speed of the knob 101 is higher than or equal to a prescribed reference speed (described later) as in a case that an operator has rotated the knob 101 with finger tips in such a manner as to move it abruptly and strongly to give it a large initial speed, the controller 200 lowers the rotation speed of the knob 101 by causing the rotation braking unit 105 to brake (dampen) the rotation of the knob 101. This allows the operator to easily cause switching to an intended shift position that corresponds to, for example, a gear position of the transmission of a vehicle.

The controller 200 functions as a target position acquiring unit (a term used in the claims). Serving as the target position acquiring unit, the controller 200 determines a stop target position (an example of the term "target position" used in the claims) intended by the operator of the vehicle on the basis of a rotation direction of the knob 101, for example. Capable of acquiring a rotation position of the knob 101 repeatedly (e.g., periodically), the controller 200 can determine a rotation direction of the knob 101 easily on the basis of rotation positions of the knob 101 detected this time and last time.

In the embodiment, since the knob 101 can be rotated by 360° or more in a desired manner, end stop positions (two end positions) as stoppers for the gear positions of the transmission of the vehicle can be realized easily by the electromagnetic brake (i.e., rotation braking unit 105). For example, where the gear positions (shift positions) of the transmission of the vehicle are four positions that are a P gear position, an R gear position, an N gear position, and a D gear position, the controller 200 determines that the stop target position should be the P gear position if the rotation direction of the knob 101 is counterclockwise and the D gear position if the rotation direction of the knob 101 is clockwise.

Likewise, for example, where the gear positions (shift positions) of the transmission of the vehicle are five positions that are a P gear position, an R gear position, an N gear position, a gear position, and an S gear position, the controller 200 determines that the stop target position should be the P gear position if the rotation direction of the knob 101 is counterclockwise and the S gear position if the rotation direction of the knob 101 is clockwise.

In other words, the controller 200 determines, on the basis of a current running direction of the knob 101, that the stop target position should be a position (shift position) corresponding to one of the two end-side gear positions (e.g., P gear position and D gear position) of the plural gear positions of the transmission of the vehicle in which the input device 100 is installed. With this measure, the input device 100 can easily realize end stop positions (two end positions) for the gear positions of the transmission of the vehicle by the electromagnetic brake (rotation braking unit 105) and, in addition, can recognize a stop target position easily according to a current rotation direction of the knob 101 without receiving any particular instruction from the operator.

Also, the controller 200 may determine, on the basis of the current running direction of the knob 101, that the stop target position should be a position (shift position) corresponding to an intermediate position between the two end-side gear positions of the plural gear positions of the transmission of the vehicle in which the input device 100 is installed. With this measure, the input device 100 can easily recognize a stop target position according to a current rotation direction of the knob 101 without receiving any particular instruction from the operator.

Alternatively, the controller 200 may determine a stop target position (an example of the term "target position" used in the claims) intended by the operator of the vehicle on the basis of a vehicle running direction (a forward direction if the vehicle is advancing or a reverse direction it the vehicle is retreating) acquired through the CAN data bus and a rotation direction of the knob 101.

For example, where the gear positions (shift positions) of the transmission of the vehicle are four positions that are a P gear position, an R gear position, an N gear position, and a D gear position, the controller 200 determines that the stop target position should be the N gear position if the vehicle running direction is the forward direction (in other words, the current shift position is the D gear position) and the rotation direction of the knob 101 is counterclockwise. That is, the shift position is changed to the N gear position adjoining the R gear position as a block control for preventing switching to a gear position that causes a change in vehicle running direction due to counterclockwise rotation of the knob 101 when the vehicle is running in the forward direction. The controller 200 determines that the stop target position should be kept at the D gear position (end stop position) if the vehicle running direction is the forward direction (in other words, the current shift position is the D gear position) and the rotation direction of the knob 101 is clockwise.

Also, the controller 200 may acquire a vehicle speed of a vehicle in which the input device 100 is installed through the CAN data bus. The controller 200 may determine a position corresponding to one (for example, N gear position) of gear positions other than a R gear position as the target position when there exists a position corresponding to the gear position (for example, R gear position) which sets the running direction of the vehicle reversed among plural gear positions of a transmission of the vehicle in a current rotational direction of the knob 101 and the vehicle speed is higher than or equal to the predetermined speed (for example, 5 km/h).

On the other hand, where the gear positions (shift positions) of the transmission of the vehicle are four positions that are a P gear position, an R gear position, an N gear position, and a D gear position, the controller 200 determines that the stop target position should be kept at the R gear position if the vehicle running direction is the reverse direction (in other words, the current shift position is the R gear position) and the rotation direction of the knob 101 is counterclockwise. That is, the shift position is kept at the R gear position adjoining the P gear position as a block control for preventing switching to a gear position (P gear position) that causes a change in vehicle running direction due to counterclockwise rotation of the knob 101 when the vehicle is running in the reverse direction.

The controller 200 determines that the stop target position should be the N gear position if the vehicle running direction is the reverse direction (in other words, the current shift position is the R gear position) and the rotation direction of the knob 101 is clockwise. That is, the shift position is changed to the N gear position adjoining the D gear position as a block control for preventing switching to a gear position (D gear position) that causes a change in vehicle running direction due to clockwise rotation of the knob 101 when the vehicle is running in the reverse direction.

In other words, the controller 200 determines, on the basis of a detected current vehicle running direction and a detected current rotation direction of the knob 101, that the stop target position should be a position corresponding a gear position adjoining a gear position that causes a change in vehicle running direction among the plural gear positions of the transmission of the vehicle in which the input device 100 is installed. With this measure, the input device 100 can easily recognize a stop target position that is suitable for a current running state of the vehicle according to a current vehicle running direction and a current rotation direction of the knob 101 without receiving any particular instruction from the operator.

Hereinafter, the stop target position may not be determined on the basis of only the detected running direction of the vehicle and the current rotation direction of the knob 101. The controller 200 may determine the stop target position on the basis of at least one or plural parameters of the vehicle. Parameters of the vehicle include the vehicle speed of the vehicle received through the CAN data bus, information relating to whether the foot brake pedal is stepped on by the operator, information relating to whether at least one door of the vehicle is opened, a situation of an ignition key in addition to the detected running direction of the vehicle and the current rotation direction of the knob 101.

The storage 210 is a storage device such as a RAM (random access memory) for storing temporal data that are used while the controller 200 performs processing, a ROM (read-only memory) for storing programs and data that are read out when the controller 200 performs processing, a hard disk drive, etc.

The vehicle controller 202 acquires information relating to a vehicle running state (e.g., vehicle speed, vehicle running direction, and whether the foot brake pedal is stepped on, whether at least one door is opened, situation of the ignition key) from the vehicle. The controller 200 acquires the information through the CAN data bus. The vehicle controller 202, which is an example of the "running direction detecting unit" used in the claims, acquires information indicating a running direction of the vehicle in which the input device 100 is installed. The controller 200 acquires the information relating to the running direction through the CAN data bus. The controller 200 converts a rotation position of the rotary shaft 102 (in other words, a rotation position of the knob 101) detected by the detector 106 into a corresponding gear position of the transmission (not shown) of the vehicle, and outputs information indicating the latter to the CAN data bus. The transmission acquires the information indicating the gear position acquired from the controller 200 through the CAN data bus. In this manner, in the vehicle in which the input device 100 according to the embodiment is installed, the transmission can be switched to a gear position intended by the operator (e.g., driver) who is manipulating the input device 100.

Figure 7:
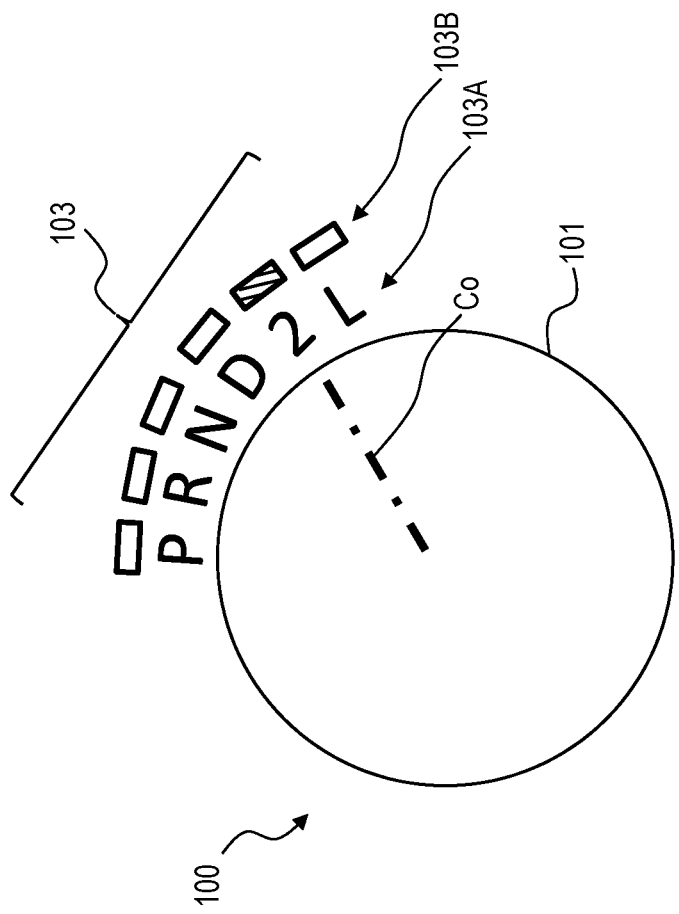
FIG. 7 is a plan view illustrating an example of a state of the input device according to the first embodiment installed in a vehicle.

FIG. 7 is a plan view illustrating an example of a state of the input device 100 according to the first embodiment installed in a vehicle.

In the embodiment, the input device 100 is installed in, for example, the vehicle compartment and the rotation position of the knob 101 corresponds to the shift position of the vehicle. In other words, the input device 100 is installed in the vehicle compartment to change the operation state (e.g., the gear position of the transmission) of the vehicle (not shown). A P gear position, an R gear position, an N gear position, a D gear position, a 2 gear position, and an L gear position shown in FIG. 7 are shift positions corresponding to respective gear positions of the transmission that are predetermined in the vehicle. The P gear position is a parking position (corresponding to a state that the output shaft of the transmission is mechanically locked and the vehicle wheels are locked), the R gear position is a reverse position (a position for the backward motion of the vehicle), the N gear position is a neutral position (corresponding to a state that the transmission is effectively disconnected from driven wheels), the D gear position is a drive position (corresponding to a state where the transmission is allowed to engage the full range of available forward gear ratios), the 2 gear position is a second gear position (corresponding to a state where the transmission is allowed to engage only the first two forward gear ratios), and the L gear position is the low position (corresponding to a state where the transmission is allowed to engage only the first forward gear).

Next, a specific operation of the input device 100 according to the embodiment will be described with reference to FIGS. 8-10.

Figure 8:
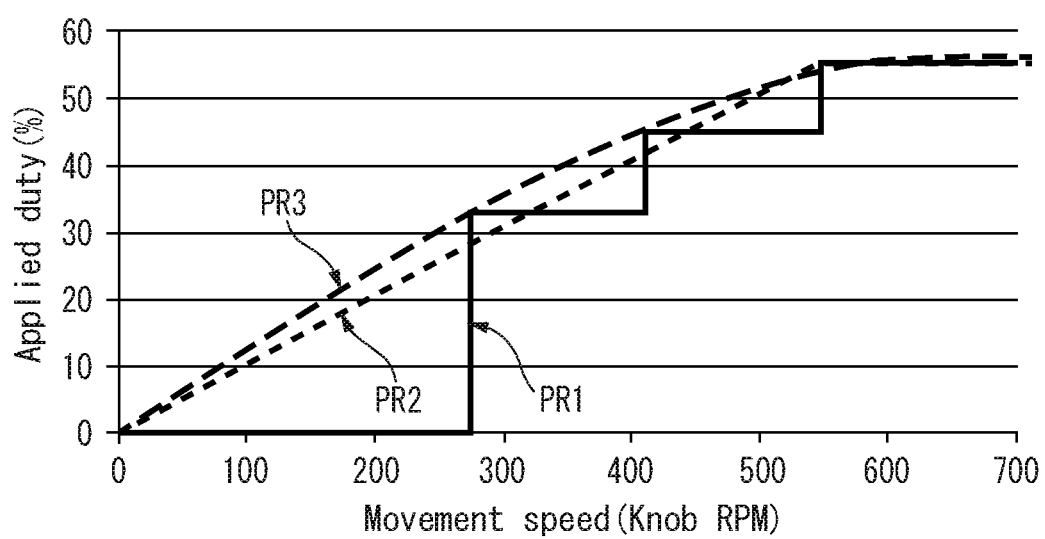
FIG. 8 is a graph illustrating an example of a relationship between the rotation speed of a knob and the duty ratio applied.
Figure 9:
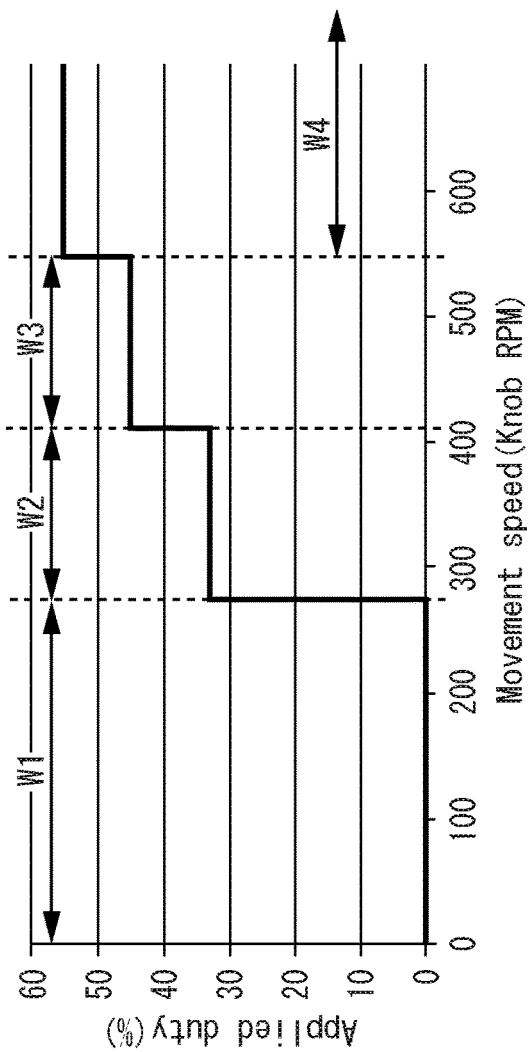
FIG. 9A is a graph illustrating an example of a relationship between plural rotation speed threshold values and corresponding duty ratios applied.
FIG. 9B is a table illustrating an example of a relationship between rotation speed ranges of the knob and corresponding duty ratios applied.

FIG. 8 is a graph illustrating an example of a relationship between the rotation speed of the knob 101 and the duty ratio applied.

FIG. 9A is a graph illustrating an example of a relationship between plural rotation speed threshold values and corresponding duty ratios applied.

FIG. 9B is a table illustrating an example of a relationship between rotation speed ranges of the knob 101 and corresponding duty ratios applied.

Figure 10:
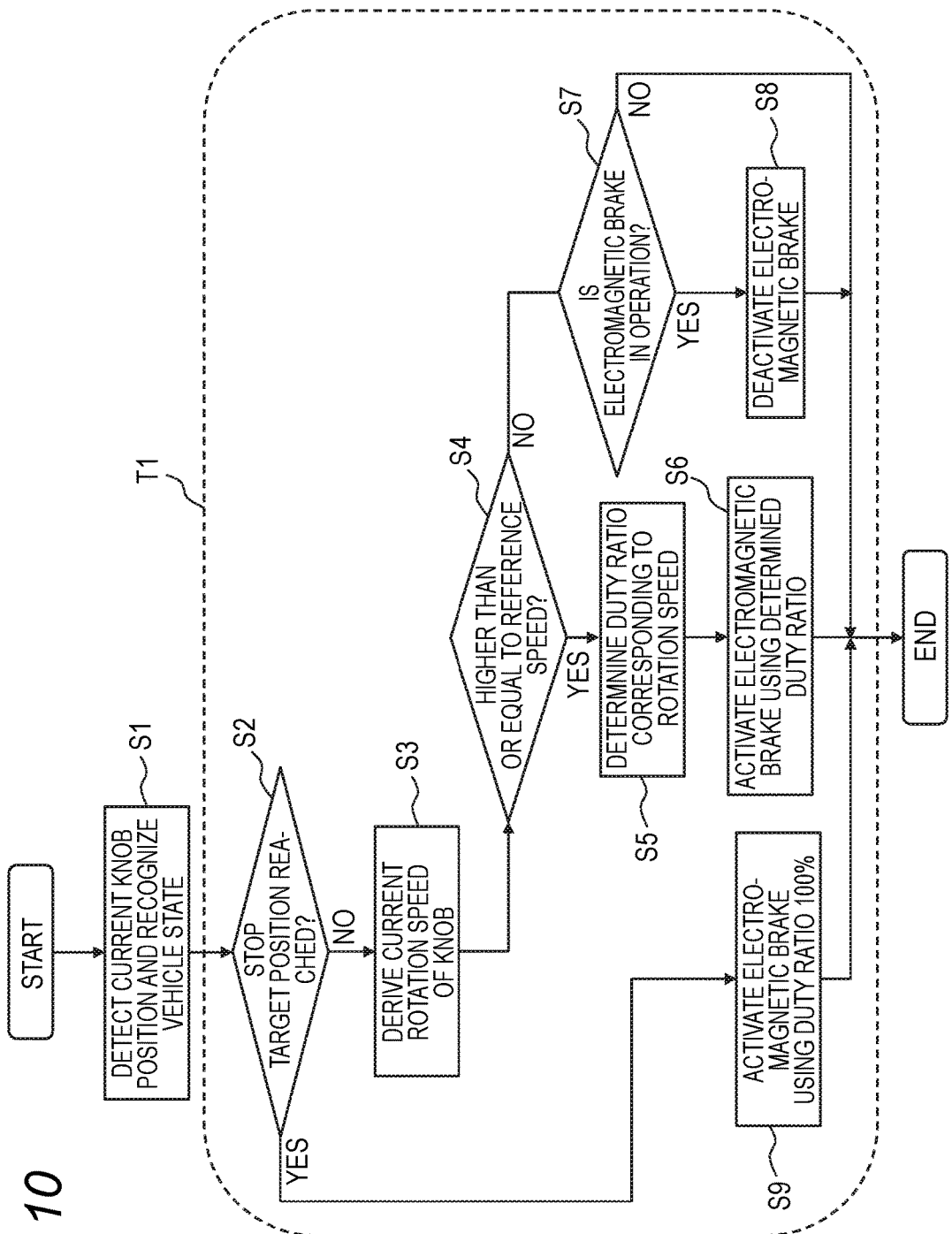
FIG. 10 is a detailed flowchart illustrating an example of an operation procedure of the input device according to the first embodiment.

FIG. 10 is a detailed flowchart illustrating an example of an operation procedure of the input device 100 according to the first embodiment.

In the first embodiment, the detector 106 of the input device 100 detects a rotation position of the knob 101 repeatedly (e.g., periodically). The rotation position means a position of the rotatable knob 101 (e.g., a position indicated by a chain line Co that corresponds to a lit indicator 103B (see FIG. 7)) has been rotated. This definition also applies to embodiments described later. If a rotation speed of the knob 101 detected by the detector 106 is higher than or equal to a prescribed reference speed (described later), the controller 200 causes the electromagnetic brake (rotation braking unit 105) to brake the rotation of the knob 101 by applying a braking force to it.

In this manner, the rotation braking unit 105 lowers the rotation speed of the knob 101. As a result, the operator (e.g., driver) can no longer rotate the knob 101 at a rotation speed that is higher than or equal to the above-mentioned prescribed reference speed, whereby the input device 100 can switch the rotation position of the knob 101 stably to a stop target position intended by the operator. The prescribed reference speed means an upper limit rotation speed of a rotation speed range in which the knob 101 can be stopped at a desired rotation position (e.g., a stop target position intended by the operator) without activating the electromagnetic brake or braking the knob 101 by a hand. This definition also applies to the embodiments described later. Settings for changing the prescribed reference speed may be made as appropriate taking into consideration, for example, improvements in performance of components, members, etc. of the individual units of the input device 100.

In the first embodiment, if the rotation speed of the knob 101 is higher than or equal to the prescribed reference speed, the controller 200 switches a braking parameter (e.g., a duty ratio used for a PWM (pulse width modulation) control) for power that is applied to the electromagnet 152 (coil) of the rotation braking unit 105 to drive it, step by step according to the rotation speed of the knob 101 (see FIG. 8). The duty ratio which is an example braking parameter can take a value between 0% and 100%. The duty ratio 0% means a state that rotation of the knob 101 is not braked at all by the PWM control of the rotation braking unit 105. On the other hand, the duty ratio 100% means a state that rotation of the knob 101 is disabled by the PWM control of the rotation braking unit 105.

That is, the controller 200 generates a control signal for braking rotation of the knob 101 using a PID (proportional-integral-differential) control and outputs it to the rotation braking unit 105 so that the knob 101 does not rotate at a rotation speed that is higher than or equal to the above-mentioned prescribed reference speed. The rotation braking unit 105 controls rotation of the knob 101 according to the control signal received from the controller 200, that is, according to a duty ratio corresponding to a rotation speed of the knob 101.

In the first embodiment, a duty ratio that is large enough to disable rotation of the knob 101 is not used. And braking is performed in such a range of strength that the operator who is moving the knob 101 would not feel uncomfortable. The controller 200 determines a duty ratio to be used in the rotation braking unit 105 so that the rotation speed of the knob 101 falls within the above-mentioned prescribed reference speed when the electromagnetic brake (rotation braking unit 105) is activated.

In the first embodiment, the time that elapses until a start of actual braking of rotation of the knob 101 by activation of the electromagnetic brake (rotation braking unit 105) is the sum of a time consumed by processing in the controller 200 (software processing time) and a rise time it takes for the electromagnet 152 of the rotation braking unit 105 to generate a prescribed magnetic force, and is equal to about a little longer than 10 ms, for example. The time consumed by processing in the controller 200, which will be described later with reference to FIG. 10, is a time it takes from detection of a rotation position of the knob 101 to a judgment that the electromagnetic brake (rotation braking unit 105) should be activated, and is equal to, for example, about 6 ms (described later with reference to FIG. 10). On the other hand, the rise time of the electromagnet 152 is equal to, for example, about 5 to 6 ms and is a known value (the same happens to the embodiments described later).

For example, when the operator has rotated the knob 101 in such a manner as to move it abruptly with finger tips to give it a large initial speed, a detected rotation speed of the knob 101 may be higher than or equal to the above-mentioned prescribed reference speed. In this case, conventionally, it is highly probable that the electromagnetic brake (rotation braking unit (105)) is not activated in time and hence the knob (101) cannot be stopped at a stop target position intended by the operator (i.e., it is rotated excessively) or rebounds from a stopper and stops at a shift position other than the stop target position.

In view of the above, in the first embodiment, when a detected rotation speed of the knob 101 is higher than or equal to the above-mentioned prescribed reference speed, the controller 200 activates the electromagnetic brake (rotation braking unit 105) gradually by, for example, switching the above-mentioned control parameter (e.g., duty ratio) step by step according to the rotation speed of the knob 101. With this measure, the rotation braking unit 105 can make the rotation speed of the knob 101 lower than the above-mentioned prescribed reference speed and brake the rotation of the knob 101 properly according to the varying duty ratio.

When the operator has rotated the knob 101 fast by applying a strong force to it, the controller 200 can lower the rotation speed of the knob 101 further by increasing the load by setting the braking force of the electromagnetic brake (rotation braking unit 105) stronger (i.e., setting the duty ratio larger).

The horizontal axis and the vertical axis of FIG. 8 represent the rotation speed (movement speed) of the knob 101 (rpm (revolutions per minute)) and the applied duty ratio (%) in the electromagnetic brake (rotation braking unit 105), respectively. FIG. 8 shows three characteristics PR1, PR2, and PR3 as example relationships between the rotation speed of the knob 101 and the duty ratio.

In the characteristic PR1, the duty ratio and hence the rotation speed of the knob 101 are switched step by step. As shown in the graph of FIG. 9A and the table of FIG. 9B, when the rotation speed of the knob 101 in a range W1 from 0 to 274 rpm, the duty ratio of the PWM control is kept at 0% and hence the rotation of the knob 101 is not dampened.

When the rotation speed of the knob 101 in a range W2 from 275 to 409 rpm, the duty ratio of the PWM control is kept at 33% and the rotation of the knob 101 is dampened a little.

When the rotation speed of the knob 101 in a range W3 from 410 to 548 rpm, the duty ratio of the PWM control is kept at 45% and the rotation of the knob 101 is dampened considerably.

When the rotation speed of the knob 101 in a range W4 from 549 rpm to a maximum value (e.g., a maximum value that the rotation speed of the knob 101 can take theoretically), the duty ratio of the PWM control is kept at 55% and the rotation of the knob 101 is dampened to a highest degree.

As described above, in the characteristic PR1, different threshold values 275, 410, and 549 rpm are employed for the rotation speed of the knob 101. When the rotation speed of the knob 101 increases or decreases so as to pass these threshold values, the controller 200 switches the braking parameter (e.g., the duty ratio of the PWM control) step by step. As a result, the input device 100 can switch the braking force for braking the rotation of the knob 101 step by step according to the detected rotation speed of the knob 101. Producing a stronger braking force as the rotation speed increases, the input device 100 can stop the knob 101 stably at a stop target position intended by the operator while accommodating a rotation speed of the knob 101 that is higher than the reference speed.

The characteristic PR2 is characteristic in which the duty ratio varies linearly with respect to the rotation speed of the knob 101 in a rotation speed range of from 0 to 549 rpm and is kept constant (e.g., at 55% in FIG. 9B) for rotation speeds that are higher than or equal to 550 rpm. That is, in the characteristic PR2, a function that correlates the rotation speed of the knob 101 with the duty ratio is set in advance.

The characteristic PR3 is characteristic in which the duty ratio varies nonlinearly (e.g., logarithmically) and is kept constant (e.g., at 55% in FIG. 9B) for rotation speeds that are higher than or equal to 550 rpm. That is, in the characteristic PR3, a function that correlates the rotation speed of the knob 101 with the duty ratio is set in advance.

As described above, unlike in the characteristic PR1, in the characteristics RP2 and PR3 the duty ratio varies continuously with increase or decrease of the rotation speed of the knob 101. The controller 200 determines a duty ratio corresponding to a rotation speed of the knob 101 on the basis of the function that correlates the rotation speed of the knob 101 with the parameter for braking of rotation of the knob 101 (e.g., duty ratio). In this manner, the input device 100 can switch the braking force for braking rotation of the knob 101 adaptively according to a detected tendency of variation (i.e., increase or decrease) of the rotation speed of the knob 101, and can therefore stop the knob 101 stably at a stop target position intended by the operator.

Next, the operation procedure illustrated by FIG. 10 will be described below with an assumption that the input device 100 has determined a stop target position intended by an operator on the basis of, for example, a rotation direction of the knob 101 or a rotation direction of the knob 101 and a vehicle running direction (i.e., acquired information indicating it). Alternatively, information indicating a stop target position may be included in pieces of information acquired by the controller 200 at step S1 together with pieces of information indicating a rotation position of the knob 101 and a vehicle state. The series of steps shown in FIG. 10 are executed repeatedly in a period that is shorter than a time (e.g., about 6 ms) consumed by processing performed by the controller 200 which is part of a time (e.g., a little longer than 10 ms) taken to start actual electromagnetic braking.

As shown in FIG. 10, at step S1, in the input device 100, the detector 106 detects a rotation position of the rotary shaft 102 (in other words, knob 101). In the input device 100, the controller 200 determines a shift position corresponding to the rotation position of the knob 101 detected by the detector 106.

At step S1, the controller 200 acquires information relating to a vehicle state via either the storage 210 or the vehicle controller 202 or the CAM data bus. The controller 200 acquires, via the vehicle controller 202 or the CAM data bus, information relating to a vehicle state that includes, for example, a current shift position, a vehicle speed, a vehicle running direction, and whether the foot brake (not shown) is stepped on by the operator. Furthermore, the controller 200 acquires information relating to a vehicle state that includes, for example, whether the electromagnetic brake (e.g., rotation braking unit 105) is in operation by reading it from the storage 210. To facilitate understanding of the description, it is assumed that the vehicle is in an ordinary running state (i.e., the current shift position is the D gear position) and a stop target position is the P gear position.

At step S2, the controller 200 judges whether the rotation position of the knob 101 acquired at step S1 is the stop target position.

If judging that the rotation position of the knob 101 acquired at step S1 is not the stop target position (S2: no), the controller 200 executes step S3. More specifically, at step S3, the controller 200 calculates a current rotation speed of the knob 101 on the basis of the rotation speed of the knob 101 detected at step S1 (in other words, the current rotation position of the knob 101) and a rotation position of the knob 101 detected last time.

At step S4, the controller 200 judges whether the current rotation speed of the knob 101 calculated at step S3 is higher than or equal to the prescribed reference speed.

If judging that the current rotation speed of the knob 101 calculated at step S3 is higher than or equal to the prescribed reference speed (S4: yes), the controller 200 executes step S5. More specifically, at step S5, the controller 200 determines a braking parameter value (e.g., a duty ratio used for a PWM control) for power to be applied to the coil of the electromagnet 152 of the rotation braking unit 105 to drive it according to the current rotation speed of the knob 101 calculated at step S3. At step S5, one of the characteristics PR1, PR2, and PR3 shown in FIG. 8 which define respective relationships between the rotation speed of the knob 101 and the duty ratio is used.

At step S6, the controller 200 generates a control signal for causing the electromagnetic brake (i.e., rotation braking unit 105) to brake the rotation of the knob 101 on the basis of the duty ratio determined at step S5, and outputs the generated control signal to the rotation braking unit 105. In the embodiment, the time consumed in total by the processing performed by the controller 200 (software processing time; see FIG. 10) which is part of the time taken to start actual electromagnetic braking (e.g., a little longer than 10 ms) is as short as about 6 ms.

The rotation braking unit 105 dampens (brakes) the rotation of the knob 101 by a PWM control using the duty ratio determined at step S5 that is indicated by the control signal received from the controller 200. The input device 100 can complete the braking of the rotation of the knob 101 that is performed by PWM-controlling the electromagnetic brake (i.e., rotation braking unit 105) according to the duty ratio when about 5 to 6 ms (a rise time of the electromagnet 152) has elapsed from the reception of the control signal from the controller 200. In this manner, the input device 100 can stop the knob 101 at the stop target position (e.g., P gear position) stably. The input device 100 can thus support safe use of the vehicle by the operator.

On the other hand, if judging that the current rotation speed of the knob 101 calculated at step S3 is lower than the prescribed reference speed (S4: no), the controller 200 executes step S7. The reason why the current rotation speed of the knob 101 is made lower than the prescribed reference speed would be activation of the electromagnetic brake (i.e., rotation braking unit 105) or friction on the knob 101 caused by the operator's touching the knob 101 during its rotation. This also applies to the embodiment described later. More specifically, at step S7, the controller 200 judges whether the electromagnetic brake (i.e., rotation braking unit 105) is in operation on the basis of information indicating it that was acquired at step S1.

If judging that the electromagnetic brake (i.e., rotation braking unit 105) is in operation (S7: yes), at step S8 the controller 200 generates a control signal for deactivating the electromagnetic brake (i.e., rotation braking unit 105) and outputs it to the rotation braking unit 105. The rotation braking unit 105 deactivates the electromagnetic brake in response to the control signal received from the controller 200. Since the input device 100 does not dampen the rotation of the knob 101, the rotation of the knob 101 is continued by the operator's manipulating it with his or her hand.

On the other hand, if judging that the electromagnetic brake (i.e., rotation braking unit 105) is not in operation (S7: no), the controller 200 does not generate a control signal for activating the electromagnetic brake (i.e., rotation braking unit 105). Thus, the rotation braking unit 105 does not activate the electromagnetic brake. Since the input device 100 does not dampen the rotation of the knob 101, the rotation of the knob 101 is continued by the operator's manipulating it with his or her hand.

If judging that the rotation position of the knob 101 acquired at step S1 is the stop target position (S2: yes), the controller 200 executes step S9. More specifically, at step S9, the controller 200 generates a control signal for stopping the rotation of the knob 101 quickly and completely (in other words, a control signal for activating the electromagnetic brake so that it will operate being PWM-controlled with a duty ratio 100%). The rotation braking unit 105 stops the rotation of the knob 101 by PWM-controlling it with a duty ratio 100% according to the control signal received from the controller 200.

As described above, the input device 100 according to the first embodiment repeatedly detects a rotation position of the knob 101 which can be rotated by a hand of an operator, and calculates a current rotation speed of the knob 101 on the basis of a current rotation position of the knob 101 and its rotation position detected last time. The input device 100 causes the electromagnetic brake (i.e., rotation braking unit 105) to brake the rotation of the knob 101 according to the calculated current rotation speed of the knob 101.

With the above operation, in the input device 100, even in a case that the knob 101 which can be rotated by, for example, 360° or more in a desired manner is rotated in such a manner as to move it abruptly with fingertips of an operator (e.g., driver) to give it a large initial speed, the rotation of the knob 101 is dampened effectively by causing the electromagnetic brake to exert a braking force according to the current rotation speed of the knob 101. Thus, the input device 100 enables stable switching to a stop target position (e.g., P gear position) intended by the operator, thereby enabling support of safe use of an operation target (e.g., vehicle).

If a current rotation position of the knob 101 is higher than or equal to the prescribed reference speed, the input device 100 causes the rotation braking unit 105 to brake the rotation of the knob 101. For example, the reference speed means an upper limit rotation speed of a rotation speed range in which the knob 101 can be stopped at a stop target position without activating the electromagnetic brake or braking the knob 101 by a hand. Thus, even in a case that, for example, the knob 101 has been rotated at high speed by a hand of an operator, the input device 100 can lower the rotation speed of the knob 101 and stop it at a stop target position by activating the electromagnetic brake according to a rotation speed produced by the rotation by the operator.

The input device 100 changes the parameter (e.g., duty ratio) of braking of rotation of the knob 101 by the electromagnetic brake according to a current rotation speed of the knob 101 and causes the rotation braking unit 105 to brake the rotation of the knob 101 using the thus-changed rotation braking parameter (e.g., duty ratio). Thus, the input device 100 can brake the rotation of the knob 101 with high accuracy according to the current rotation speed of the knob 101 using the rotation braking parameter (e.g., duty ratio) for the electromagnetic brake.

The input device 100 determines a braking parameter on the basis of the table which correlates the rotation speed of the knob 101 with the parameter (e.g., duty ratio) of braking of rotation of the knob 101 (see FIG. 9B). The input device 100 causes the rotation braking unit 105 to brake rotation of the knob 101 using the thus-determined braking parameter. In this manner, the input device 100 can determine a rotation braking parameter (e.g., duty ratio) for the electromagnetic brake easily according to a current rotation speed of the knob 101, and brake the rotation of the knob 101 with high accuracy.

The input device 100 switches the parameter (e.g., duty ratio) of braking of the knob 101 step by step according to the rotation speed of the knob 101 that increases or decreases so as to pass plural threshold values (e.g., 275, 410, and 549 rpm shown in FIG. 9B). In this manner, the input device 100 can switch the braking force for braking rotation of the knob 101 step by step according to detected rotation speeds of the knob 101. Since in this manner the input device 100 produces a stronger braking force as the rotation speed increases, the input device 100 can stop the knob 101 stably at a stop target position intended by an operator for a rotation speed that is higher than the reference speed.

Furthermore, the input device 100 determines a rotation braking parameter (e.g., duty ratio) according to a function that correlates the rotation speed of the knob 101 with the parameter of braking of rotation of the knob 101. The input device 100 causes the rotation braking unit 105 to brake rotation of the knob 101 using the determined rotation braking parameter. In this manner, the input device 100 can switch, adaptively, the braking force for braking rotation of the knob 101 according to a detected tendency of increase or decrease of the rotation speed of the knob 101, and can therefore stop the knob 101 stably at a stop target position intended by an operator.

Embodiment 2

In the first embodiment, since the electromagnetic brake (i.e., rotation braking unit 105) exerts a braking force on the knob 101 according to a rotation speed of the knob 101 that is higher than the reference speed, the knob 101 is stopped at a current shift position or a shift position next to it. In this case, for example, it may be difficult for an operator to stop the knob 101 after rotating (moving) it from a current shift position (e.g., D gear position) to an end stop position (e.g., P gear position) past plural shift positions by a single rotating operation.

In view of the above, in an input device 100 according to the second embodiment, the knob 101 is rotated (moved) from a current rotation position to a stop end position by, for example, a single rotating operation made by an operator in such a manner that rotation of the knob 101 is continued utilizing inertia that depends on a rotation speed of the knob 101. The input device 100 according to the second embodiment has the same internal configuration as the input device 100 according to the first embodiment shown in FIG. 6. In the second embodiment, only differences in operation from the first embodiment will be described mainly; descriptions of what are the same as in the first embodiment will be simplified or omitted.

In the input device 100 according to the second embodiment, a rotation position of the knob 101 is detected by the detector 106 repeatedly (e.g., periodically). If the rotation speed of the knob 101 detected by the detector 106 is higher than or equal to a prescribed reference speed (described above), the controller 200 adjusts the activation start timing of the rotation braking unit 105 according to the difference between a stop target position and a current rotation position of the knob 101 and the current rotation speed of the knob 101.

With this measure, the input device 100 can cause the rotation braking unit 105 to start braking the rotation of the knob 101 earlier as the rotation speed of the knob 101 is faster taking into consideration a movement distance (rotation amount) between the current rotation position and the stop target position. As a result, the knob 101 can be stopped at the stop target position stably.

Figure 11:
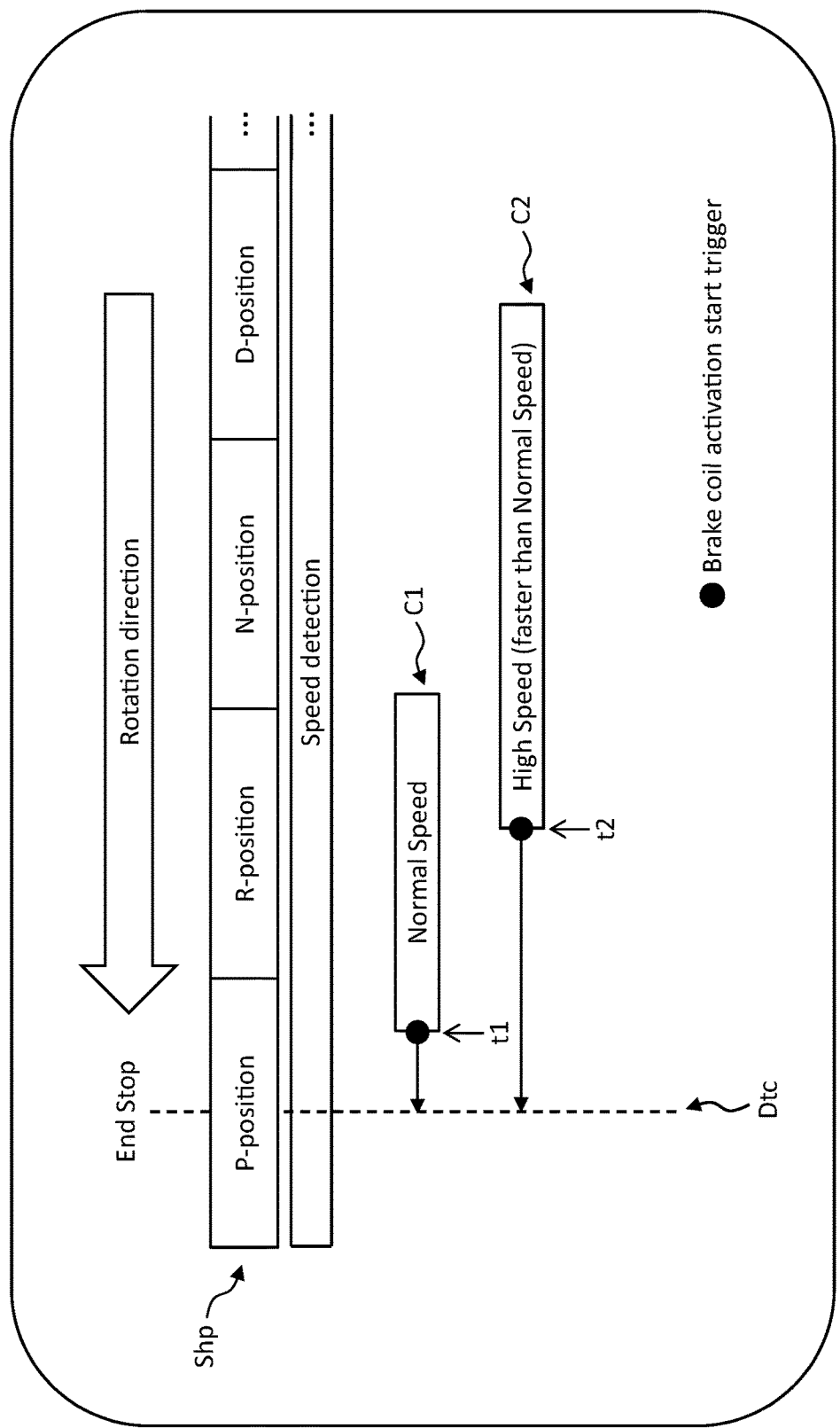
FIG. 11 is an explanatory diagram illustrating an example of an operation outline of an input device according to a second embodiment.

FIG. 11 is an explanatory diagram illustrating an example of an operation outline of the input device 100 according to the second embodiment.

Figure 12:
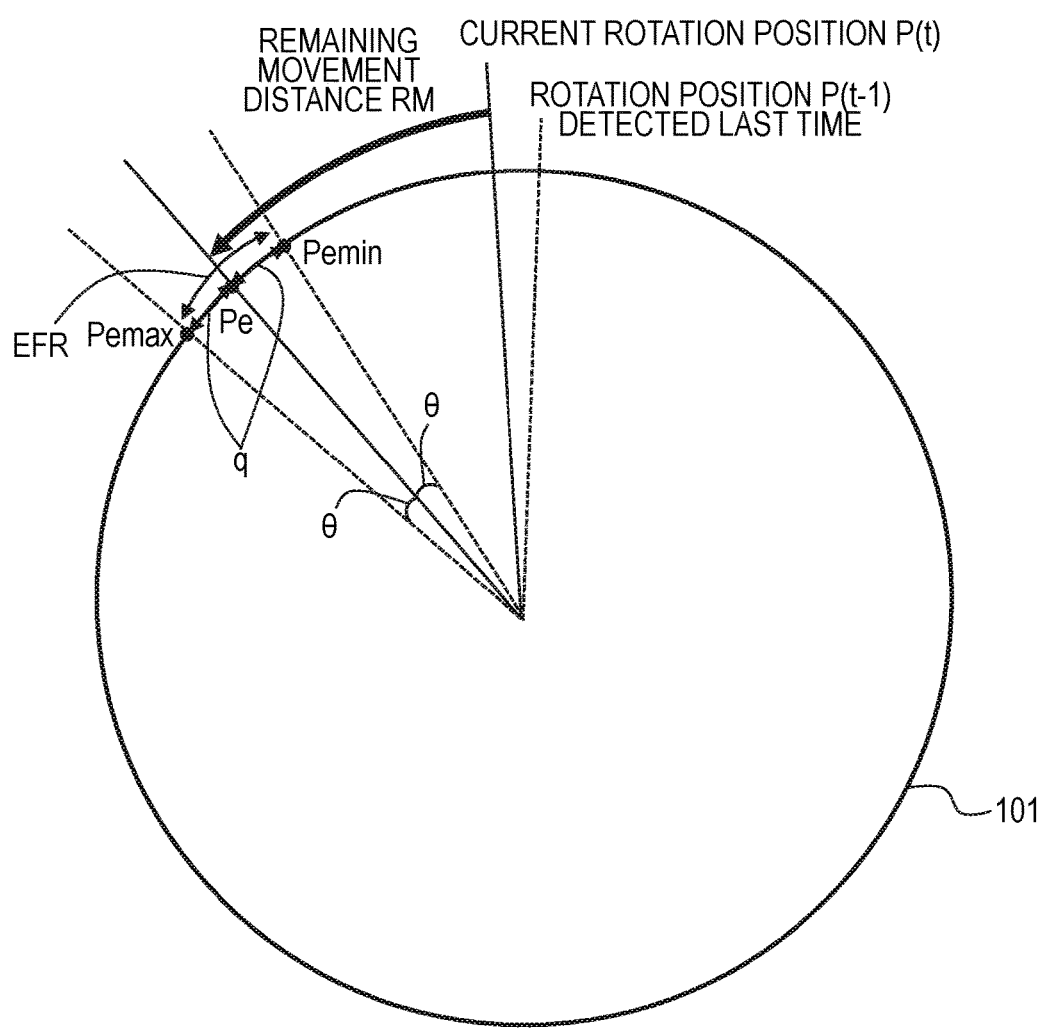
FIG. 12 is an explanatory diagram illustrating an example of a relationship between a remaining movement distance to a stop target position and an effective stop target range.

FIG. 12 is an explanatory diagram illustrating an example of a relationship between a remaining movement distance to a stop target position and an effective stop target range EFR.

Figure 13:
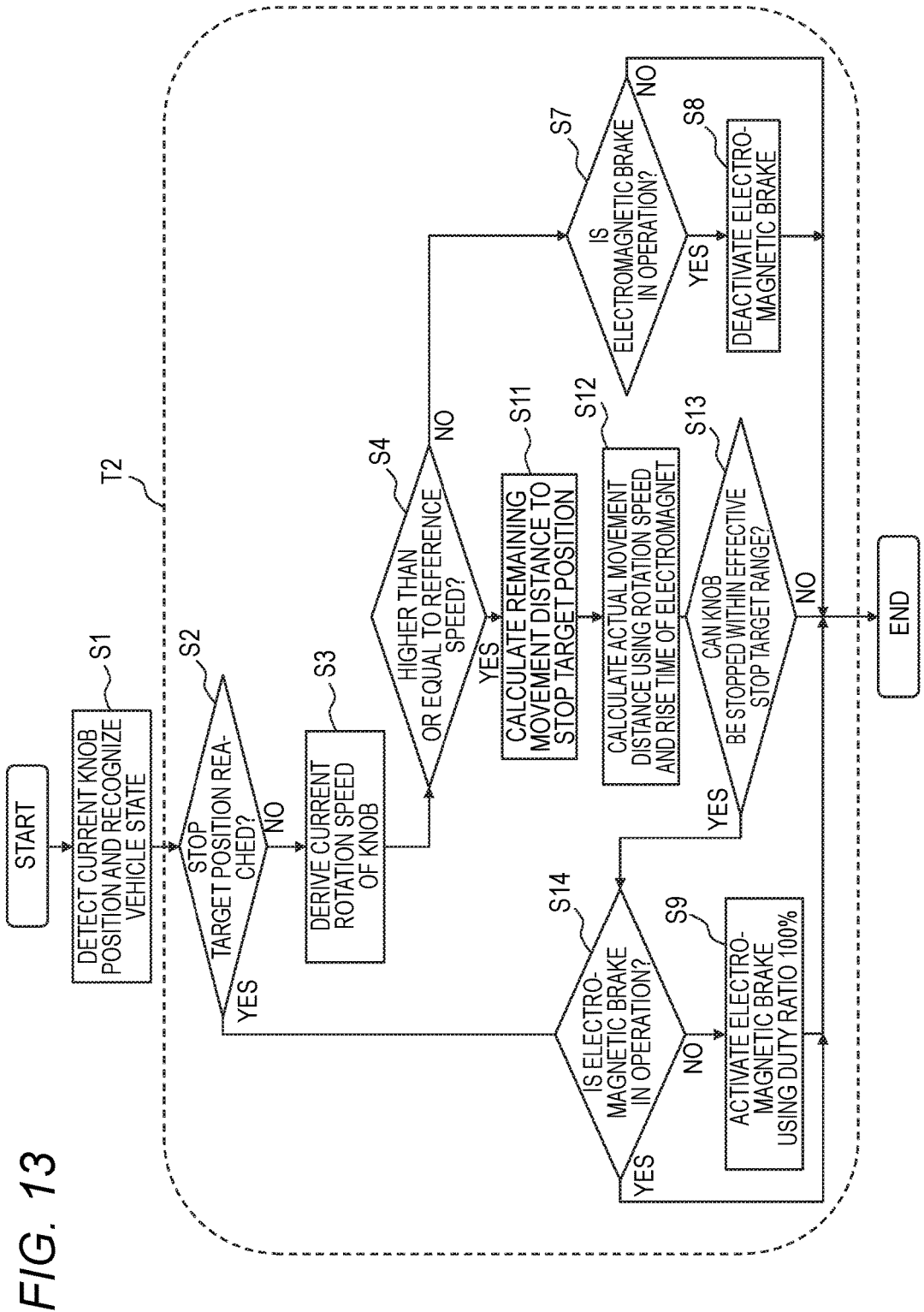
FIG. 13 is a detailed flowchart illustrating an example of an operation procedure of the input device according to the second embodiment.

FIG. 13 is a detailed flowchart illustrating an example of an operation procedure of the input device 100 according to the second embodiment.

FIG. 11 shows an operation in a case that the current rotation position (shift position) of the knob 101 is the D gear position and the stop target position is the P gear position (P-position). In FIG. 11, the gear positions Shp of the transmission of a vehicle in which the input device 100 is installed are named a P gear position, an R gear position (R-position), an N gear position (N-position), a gear position (D-position) from the left in FIG. 11 so as to correspond to actual shift positions.

Referring to FIG. 11, assume that the knob 101 is rotated counterclockwise by a hand of an operator (e.g., driver) from the D gear position to the P gear position. As in the first embodiment, in the input device 100, the detector 106 detects a rotation position of the knob 101 repeatedly (e.g., periodically).

Now assume two use cases (use cases C1 and C2) that are different from each other in the rotation speed of the knob 101. In each of use cases C1 and C2, a rotation speed calculated by the controller 200 is higher than or equal to the above-mentioned prescribed reference speed.

In use case C1, although the rotation speed of the knob 101 is higher than or equal to the prescribed reference speed, it is a normal speed at which the knob 101 can be stopped within the range of one shift position when, for example, the electromagnetic brake (i.e., rotation braking unit 105) is driven with a duty ratio 100%. Thus, where the stop target position is the P gear position, if activation of the electromagnetic brake is started at a time point t1 (brake coil activation start trigger) when the knob 101 enters the P gear position range, the knob 101 will be stopped at the detent center Dtc of the P gear position or in the detent range Dtrg having the detent center Dtc at the center. As a result, the knob 101 can be stopped at the P gear position.

In use case C2, the rotation speed of the knob 101 is higher than or equal to the prescribed reference speed and it is a high speed at which the knob 101 cannot be stopped within the range of one shift position even if, for example, the electromagnetic brake (i.e., rotation braking unit 105) is driven with a duty ratio 100%. Thus, where the stop target position is the P gear position, if activation of the electromagnetic brake is started at a time point t2 (brake coil activation start trigger) when the knob 101 enters the R gear position range (i.e., the position that is one position upstream of the P gear position), the knob 101 will be stopped at the detent center Dtc of the P gear position or in the detent range Dtrg having the detent center Dtc at the center. As a result, the knob 101 can be stopped at the P gear position.

In this manner, the input device 100 can stop the knob 101 at a stop target position stably by adjusting the activation start timing (brake coil activation start trigger) of the electromagnetic brake (i.e., rotation braking unit 105) according to a rotation speed of the knob 101.

An operation that the input device 100 determines timing of a start of braking of rotation of the knob 101 will be described in a specific manner with reference to FIG. 12.

The controller 200 calculates a current rotation speed of the knob 101 using the difference between a current rotation position P(t) of the knob 101 and its rotation position P(t−1) detected last time and a detection time interval (default value). Furthermore, the controller 200 calculates the product of the current rotation speed of the knob 101 and an activation time (default value) of the coil of the electromagnet 152 as a movement distance (rotation amount) that the knob 101 covers until a start of operation (i.e., braking) of the electromagnetic brake (i.e., rotation braking unit 105) with the current rotation speed of the knob 101.

Furthermore, the controller 200 calculates a remaining movement distance RM (i.e., remaining rotation amount) from the current rotation position P(t) of the knob 101 to a stop target position Pe. Still further, the controller 200 calculates a width of an effective stop target range EFR which corresponds to the detent range Dtrg of the mechanical detent mechanism DTM of the input device 100. As shown in FIG. 12, the effective stop target range EFR is a range from a position Pemin (i.e., a position corresponding to the lower limit position Dtmn of the detent range Dtrg) which is located upstream of the stop target position Pe and is distant from it by a prescribed distance q which is part of the remaining movement distance RM to a position Pemax (i.e., a position corresponding to the upper limit position Dtmax of the detent range Dtrg) which is located downstream of the stop target position Pe and is distant from it by the prescribed distance q. The prescribed distance q is determined from the radius of the knob 101 and a rotation angle θ (e.g., about 10°) by which the knob 101 rotates as the ball 172 moves from the detent center Dtc to the upper limit position Dtmax or the lower limit position Dtmn of the detent range Dtrg.

As described above with reference to FIG. 5, the effective stop target range EFR is set so as to correspond to the detent range Dtrg of the mechanical detent mechanism DTM of the input device 100. This means that if the knob 101 will move to within the effective stop target range EFR with its current rotation speed when the electromagnetic brake (i.e., rotation braking unit 105) starts operation (braking), activation of the electromagnetic brake (i.e., rotation braking unit 105) is started at the present time, whereby the knob 101 will be stopped at the step target position by the mechanical detent mechanism DTM.

Next, the operation procedure illustrated by FIG. 13 will be described below with an assumption that the input device 100 has determined a stop target position intended by an operator on the basis of, for example, a rotation direction of the knob 101 or a rotation direction of the knob 101 and a vehicle running direction (i.e., acquired information indicating it). Alternatively, information indicating a stop target position may be included in pieces of information acquired by the controller 200 at step S1 together with pieces of information indicating a rotation position of the knob 101 and a vehicle state. Steps in FIG. 13 having the same ones in FIG. 10 are given the same step numbers as the latter and descriptions therefore will be simplified or omitted, and steps that are different than in FIG. 10 will be described below mainly. The series of steps shown in FIG. 13 are executed repeatedly in a period that is shorter than a time (e.g., about 6 ms) consumed by processing performed by the controller 200 which is part of a time (e.g., a little longer than 10 ms) taken to start actual electromagnetic braking.

Referring to FIG. 13, if judging that the rotation speed calculated at step S3 is higher than or equal to the prescribed reference speed (S4: yes), the controller 200 executes step S11. More specifically, at step S11, the controller 200 calculates a remaining movement distance RM (i.e., remaining rotation amount) from the current rotation position P(t) to the stop target position Pe.

At step S12, the controller 200 calculates the product of the current rotation speed of the knob 101 and a rise time (default value) of the electromagnet 152 as a movement distance that the knob 101 will travel with its current rotation speed until a start of operation (braking) of the electromagnetic brake (i.e., rotation braking unit 105).

At step S13, the controller 200 judges whether the knob 101 can be stopped at the stop target position if activation of the electromagnetic brake (i.e., rotation braking unit 105) is started at the present time. More specifically, the controller 200 judges whether the knob 101 will have been moved within the effective stop target range EFR with its current rotation speed when the electromagnetic brake (i.e., rotation braking unit 105) starts operation (braking).

If judging that the knob 101 cannot be stopped at the stop target position if activation of the electromagnetic brake (i.e., rotation braking unit 105) is started at the present time (S13: no), the controller 200 finishes the execution of the process shown in FIG. 13. In other words, since the knob 101 will not be stopped at the stop target position even if activation of the electromagnetic brake is started at the present time, the rotation of the knob 101 is continued using the inertia that depends on the rotation speed of the knob 101 until it is judged that the knob 101 can be stopped at the stop target position by activation of the electromagnetic brake.

On the other hand, if judging that the knob 101 can be stopped at the stop target position if activation of the electromagnetic brake (i.e., rotation braking unit 105) is started at the present time (S13: yes), at step S14 (as at step S1) it is judged whether the electromagnetic brake (i.e., rotation braking unit 105) is in operation.

If judging that the electromagnetic brake (i.e., rotation braking unit 105) is in operation (S14: yes), the controller 200 finishes the execution of the process shown in FIG. 13.

In other words, since the electromagnetic brake is already in operation, the knob 101 will stop at the stop target position.

On the other hand, if judging that electromagnetic brake (i.e., rotation braking unit 105) is not in operation (S14: no), at step S9 the controller 200 outputs, to the rotation braking unit 105, a control signal for stopping the rotation of the knob 101 quickly and completely (in other words, a control signal for activating the electromagnetic brake so that it will operate being PWM-controlled with a duty ratio 100%). The rotation braking unit 105 stops the rotation of the knob 101 by PWM-controlling it with a duty ratio 100% according to the control signal received from the controller 200. The electromagnetic brake is activated in this manner, whereby the knob 101 will be stopped at the stop target position.

As described above, the input device 100 according to the second embodiment repeatedly detects a rotation position of the knob 101 which can be rotated by a hand of an operator, and adjusts the activation start timing of the rotation braking unit 105 (i.e., electromagnetic brake) according to the difference between a stop target position and a current rotation position of the knob 101 and the current rotation speed of the knob 101. Capable of judging, according to a current rotation position and rotation speed of the knob 101, whether to adjust the activation start timing of the electromagnetic brake, the input device 100 can stop the knob 101 at the stop target position.

The input device 100 sets activation timing of the rotation braking unit 105 corresponding to a current rotation speed of the knob 101 earlier than activation start timing of the rotation braking unit 105 corresponding to the prescribed reference speed. With this measure, in the input device 100, the faster the current rotation speed of the knob 101, the earlier the rotation braking unit 105 can start the braking rotation of the knob 101, taking into consideration a movement distance (rotation amount) from a current rotation position of the knob 101 to a stop target position. As a result, the knob 101 can be stopped at the stop target position stably.

The input device 100 determines a start of activation of the rotation braking unit 105 when a rotation amount of the knob 101 from a position of the knob 101 where the knob 101 is rotated with the current rotation speed to a rotation position of the knob 101 where braking of the rotation of the knob 101 is started falls within an effective stop target range EFR from the difference between the target position and the current rotation position of the knob 101 minus a predetermined value q to the difference plus the predetermined value q. Therefore, the input device 100 can continue rotation of the knob 101 making good use of the inertia that depends on a rotation speed of the knob 101 or brake rotation of the knob 101 by activating the electromagnetic brake, according to a current rotation position and rotation speed of the knob 101 and a stop target position. As a result, the knob 101 can be stopped at the stop target position stably by, for example, a single rotating operation of an operator.

Embodiment 3

In an input device 100 according to a third embodiment, switching is made between the operation of the input device 100 according to the first embodiment and the operation of the input device 100 according to the second embodiment according to whether the vehicle in which the input device 100 is installed is running ordinarily or is in a low-speed state immediately before a stop. The input device 100 according to the third embodiment has the same internal configuration as the input devices 100 according to the first and second embodiments shown in FIG. 6. In the third embodiment, only differences in operation etc. from the first and second embodiments will be described mainly; descriptions of what are the same as in the first or second embodiment will be simplified or omitted.

Figure 14:
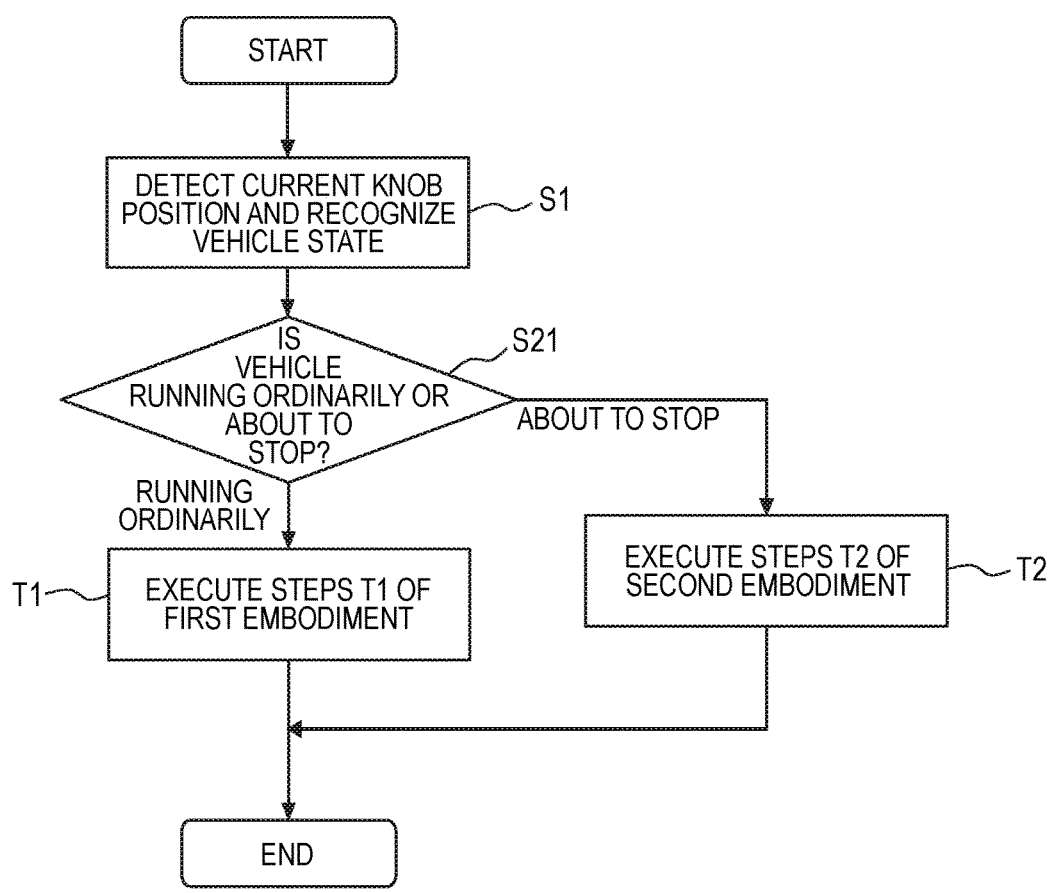
FIG. 14 is a detailed flowchart illustrating an example of an operation procedure of an input device according to a third embodiment.

FIG. 14 is a detailed flowchart illustrating an example of an operation procedure of the input device 100 according to the third embodiment.

The operation procedure illustrated by FIG. 14 will be described below with an assumption that the input device 100 has determined a stop target position intended by an operator on the basis of, for example, a rotation direction of the knob 101 or a rotation direction of the knob 101 and a vehicle running direction (i.e., acquired information indicating it). Alternatively, information indicating a stop target position may be included in pieces of information acquired by the controller 200 at step S1 together with pieces of information indicating a rotation position of the knob 101 and a vehicle state. Steps in FIG. 14 having the same ones in FIG. 10 or 13 are given the same step numbers as the latter and descriptions therefore will be simplified or omitted, and steps that are different than in FIGS. 10 and 13 will be described below mainly.

Referring to FIG. 14, after execution of step S1, at step S21, the input device 100 judges whether the vehicle in which the input device 100 is installed is running ordinarily or is in a low-speed state immediately before a stop on the basis of information relating to a vehicle running state acquired at step S1.

In the third embodiment, the term "low-speed state immediately before a stop" means, for example, a state that the vehicle speed is at a lowest speed (e.g., 5 km/h) at which an operator of the input device 100 can continue to drive the car slowly. The term "low-speed state immediately before a stop" that is employed at step S21 may be replaced by, for example, a term "state that the vehicle is almost stopped." This is because an operator (e.g., driver" can make switching from the D gear position to either the P gear position or the R gear position by rotating the knob 101 even if the vehicle speed is at a speed (e.g., 0 to 5 km/h) of the state that the vehicle is almost stopped.

If judging at step S21 that the vehicle is running ordinarily, at step T1 the controller 200 executes the same steps as a series of steps T1 of the first embodiment (enclosed by a broken line in FIG. 10). That is, if the vehicle is running ordinarily, the input device 100 detects a rotation position of the knob 101 repeatedly and determines a current rotation speed of the knob 101 on the basis of a current rotation position of the knob 101 and its rotation position detected last time. Then the input device 100 causes the electromagnetic brake (i.e., rotation braking unit 105) to brake the rotation of the knob 101 according to the determined current rotation speed of the knob 101.

While the vehicle is running, ordinarily there is a tendency that the probability that a shift is made from one (e.g., gear position) of the two end stop positions to the other (e.g., P gear position) is low. With this tendency, while the vehicle is running, the input device 100 can brake the rotation of the knob 101 in response to the rotation speed of the knob 101 by means of the electromagnetic brake. In this way, the input device 100 can impose a proper restriction on the rotation speed of the knob 101, and restrict an movable amount of the shift position from a current shift position. The input device 100 can cause an operator (e.g., driver) to perform a shift operation carefully.

On the other hand, if judging at step S21 that the vehicle is in a low-speed state immediately before a stop, at step T2 the controller 200 executes the same steps as a series of steps T2 of the second embodiment (enclosed by a broken line in FIG. 13). That is, if the vehicle is in a low-speed state immediately before a stop, the input device 100 detects a rotation position of the knob 101 repeatedly and adjusts the activation start timing of the rotation braking unit 105 (i.e., electromagnetic brake) according to the difference between a stop target position and a current rotation position of the knob 101 and a current rotation speed of the knob 101.

If the vehicle is in a low-speed state immediately before a stop (e.g., 5 km/h), ordinarily there is a tendency that the probability that a shift is made from one end stop position (e.g., D gear position) to the other end stop position (e.g., P gear position) is high. With this tendency, in the low-speed state immediately before a stop, if the rotation speed of the knob 101 is higher than or equal to the prescribed reference speed, the input device 100 can stop the knob 101 by activating the rotation braking unit 105 (i.e., electromagnetic brake) with adjustment of the activation start timing. Thus, the input device 100 allows an operator (e.g., driver) to perform a shift operation that passes plural shift positions.

The disclosure is not limited to the above embodiments. For example, another embodiment may be conceived by combining, in a desired manner, constituent elements disclosed in the specification by removing several constituent elements of a certain embodiment described above. And the disclosure encompasses modified embodiments as obtained by modifying the above embodiments by those skilled in the art without departing from the scope of the disclosure as defined by the claims.

For example, although in each of the above embodiments the input device 100 is equipped with the operation force applying unit 107, it may be omitted.

For example, although in each of the above embodiments the input device 100 is equipped with the operation member that is capable of performing a rotational operation by the hand of the operator, the input device may be equipped with an operation member that is capable of performing an operation other than the rotational operation above. For example, the operation member may be a lever that sets the gear position of the transmission of the vehicle in accordance with a linearly back and forth movement by a hand of an operator when plural positions for setting the gear positions of the transmission of the vehicle are linearly disposed in order to alter the gear position of the transmission of the vehicle.

In the present disclosure, the input device may have the same configuration as the input device mentioned in any of above each embodiment when the operation member is constituted by an object that moves approximately linearly such as the lever. Concretely, the input device may have an operation member that moves approximately linearly (for example, a well-known lever) and is made of different materials from the knob 101, a braking unit, a speed determiner and a controller. The input device also may have a target position acquirer and a running direction detector.

The operation member is capable of performing an operation by a hand of an operator. The braking unit is configured to brake a movement of the operation member. The speed determiner is configured to determine a current speed of the operation member. The controller is configured to cause the braking unit to brake the movement of the operation member in response to the current speed of the operation member. The target position acquirer is configured to acquire information relating to a target position where the operation member is to be stopped. The running direction detector is configured to detect a running direction of a vehicle in which the input device is installed.

Here, the details of the above embodiments of the disclosure are summarized as follows.

[1] The disclosure provides an input device comprising: an operation member that is capable of performing an operation by a hand of an operator; a braking unit configured to brake a movement of the operation member; a speed determiner configured to determine a current speed of the operation member; and a controller configured to cause the braking unit to brake the movement of the operation member in response to the current speed of the operation member.

[2] The input device according to the item [1], further comprising; a detector configured to detect a position of the operation member repeatedly; wherein the speed determiner is configured to determine the current speed of the operation member based on the current position of the operation member and a previous position of the operation member.

[3] The input device according to the item [1] or [2], wherein the controller is configured to cause the braking unit to brake the movement of the operation member when the current speed of the operation member is higher than or equal to a predetermined reference speed.

[4] The input device according to any one of the items [1] to [3], wherein the controller is configured to alter a braking parameter for braking the movement of the operation member in response to the current speed, and cause the braking unit to brake the movement of the operation member using the altered braking parameter.

[5] The input device according to the item [4], wherein the controller is configured to determine the braking parameter based on a table that correlates the speed of the operation member with the braking parameter, and cause the braking unit to brake the movement of the operation member using the determined braking parameter.

[6] The input device according to the items [4] or [5], wherein the controller is configured to switch the braking parameter in a stepwise fashion every time when the speed of the operation member passes a predetermined threshold value.

[7] The input device according to the item [4], wherein the controller is configured to determine the braking parameter based on a function that correlates the speed of the operation member with the braking parameter, and cause the braking unit to brake the movement of the operation member using the determined braking parameter.

[8] The input device according to any one of the items [2] to [7], further comprising: a target position acquirer configured to acquire information relating to a target position where the operation member is to be stopped, wherein the controller is configured to adjust activation start timing of the braking unit in response to a difference between the target position and the current position of the operation member and the current speed of the operation member.

[9] The input device according to the item [8], wherein the controller is configured to set the activation start timing of the braking unit corresponding to the current speed of the operation member earlier than activation start timing of the braking unit corresponding to the predetermined reference speed.

[10] The input device according to the item [8], wherein the controller is configured to determine a start of activation of the braking unit when a movement amount from a position of the operation member where the operation member is moved with the current speed to a position of the operation member where braking of the movement of the operation member is started falls within a range from the difference between the target position and the current position of the operation member minus a predetermined value to the difference plus the predetermined value.

[11] The input device according to any one of the items [8] to [10], wherein the target position acquirer is configured to determine, as the target position, based on a current movement direction of the operation member, a position corresponding to one of two end positions of plural gear positions of a transmission of a vehicle in which the input device is installed.

[12] The input device according to any one of the items [8] to [10], wherein the target position acquirer is configured to determine, as the target position, based on a current movement direction of the operation member, a position corresponding to an intermediate gear position between the two end positions of plural gear positions of a transmission of a vehicle in which the input device is installed.

[13] The input device according to any one of the items [8] to [10], further comprising: a running direction detector configured to detect a running direction of a vehicle in which the input device is installed, wherein the target position acquirer is configured to determine, as the target position, based on at least the detected running direction of the vehicle and a current movement direction of the operation member, a position corresponding to a gear position adjoining a gear position which causes a change in the running direction of the vehicle among plural gear positions of a transmission of the vehicle.

Although each of the above embodiments is directed to the case that the input device 100 serves to switch gear positions of a vehicle, it may be such as to operate a car navigation system or a car audio apparatus. In this case, the number of positions may be changed only when the vehicle speed is zero. Furthermore, the input device 100 can be applied to any of various apparatus such as a TV receiver and an air-conditioner to operate it.

Although each of the above embodiments employs the electromagnetic rotation braking unit 105 which is disposed outside the outer circumferential surface of the rotary shaft 102, the type and the attachment position of the rotation braking unit may be determined in a desired manner.

When, for example, the vehicle is not in a drive mode, the rotation braking unit 105 and the operation force applying unit 107 may be disabled to allow the knob 101 to be rotated freely. This makes it possible to adjust the wind strength of an air-conditioner or the like and the sound volume of an audio apparatus.

Capable of being applied to, for example, apparatus that are controlled by a rotating operation such as a vehicle and an electronic apparatus, the disclosure is useful when applied to input devices capable of switching an operation member such as a rotatable knob stably to a stop target position intended by an operator even in a case that the operator rotates the operation member in such a manner as to move it abruptly with fingertips to give it a large initial speed, and thereby enabling support of safe use of an operation target.

What is claimed is:

1. An input device comprising:
   a member configured to be operated by a hand of an operator;
   a brake configured to brake a movement of the member;
   a controller configured to:
   determine a current speed of the member based on a current position of the member and a previous position of the member,
   cause the brake to brake the movement of the member in response to the current speed of the member,
   determine a position of the member repeatedly,
   acquire information relating to a target position where the member is to be stopped,
   adjust an activation start timing of the brake in response to a difference between the target position and the current position of the member and the current speed of the member, and
   determine, as the target position, based on a current movement direction of the member, a position corresponding to one of two end positions of plural gear positions of a transmission of a vehicle in which the input device is installed.

2. The input device according to claim 1, wherein the controller is configured to cause the brake to brake the movement of the member when the current speed of the member is higher than or equal to a predetermined reference speed.

3. The input device according to claim 1, wherein the controller is configured to alter a braking parameter for braking the movement of the member in response to the current speed, and cause the brake to brake the movement of the member using the altered braking parameter.

4. The input device according to claim 3, wherein the controller is configured to determine the braking parameter based on a table that correlates the current speed of the member with the braking parameter, and cause the brake to brake the movement of the member using the determined braking parameter.

5. The input device according to claim 3, wherein the controller is configured to switch the braking parameter in a stepwise fashion each time the current speed of the member passes a predetermined threshold value.

6. The input device according to claim 3, wherein the controller is configured to determine the braking parameter based on a function that correlates the current speed of the member with the braking parameter, and cause the brake to brake the movement of the member using the determined braking parameter.

7. The input device according to claim 1, wherein the controller is configured to set the activation start timing of the brake corresponding to the current speed of the member earlier than an activation start timing of the brake corresponding to a predetermined reference speed.

8. The input device according to claim 1, wherein the controller is configured to determine a start of activation of the brake when a movement amount from a position of the member where the member is moved with the current speed to a position of the member where braking of the movement of the member is started falls within a range from the difference between the target position and the current position of the member minus a predetermined value to the difference plus the predetermined value.

9. The input device according to claim 1, wherein the movement is a rotational movement, wherein the current speed is a current rotational speed.

10. The input device according to claim 9, wherein the controller is configured to determine the current rotational speed of the member based on the current position of the member and the previous position of the member.

11. The input device according to claim 9,
wherein the controller is configured to cause the brake to brake the rotational movement of the member when the current rotational speed of the member is higher than or equal to a predetermined reference speed.

12. The input device according to claim 9,
wherein the controller is configured to alter a braking parameter for braking the rotational movement of the member in response to the current rotational speed, and cause the brake to brake the rotational movement of the member using the altered braking parameter.

13. The input device of claim 1, further comprising:
a speed determiner configured to determine the current speed of the member.

14. An input device comprising:
a member configured to be operated by a hand of an operator;
a brake configured to brake a movement of the member;
a controller configured to:
determine a current speed of the member based on a current position of the member and a previous position of the member,
cause the brake to brake the movement of the member in response to the current speed of the member,
determine a position of the member repeatedly,
acquire information relating to a target position where the member is to be stopped,
adjust an activation start timing of the brake in response to a difference between the target position and the current position of the member and the current speed of the member,
determine, as the target position, based on a current movement direction of the member, a position corresponding to an intermediate gear position between two end positions of plural gear positions of a transmission of a vehicle in which the input device is installed.

15. The input device according to claim 14,
wherein the controller is configured to cause the brake to brake the movement of the member when the current speed of the member is higher than or equal to a predetermined reference speed.

16. The input device according to claim 14,
wherein the controller is configured to alter a braking parameter for braking the movement of the member in response to the current speed, and cause the brake to brake the movement of the member using the altered braking parameter.

17. An input device comprising:
a member configured to be operated by a hand of an operator;
a brake configured to brake a movement of the member;
a controller configured to:
determine a current speed of the member based on a current position of the member and a previous position of the member,
cause the brake to brake the movement of the member in response to the current speed of the member,
determine a position of the member repeatedly,
acquire information relating to a target position where the member is to be stopped,
adjust an activation start timing of the brake in response to a difference between the target position and the current position of the member and the current speed of the member,
determine a running direction of a vehicle in which the input device is installed, and
determine, as the target position, based on at least the determined running direction of the vehicle and a current movement direction of the member, a position corresponding to a gear position adjoining a gear position which causes a change in the running direction of the vehicle among plural gear positions of a transmission of the vehicle.

18. The input device according to claim 17,
wherein the controller is configured to cause the brake to brake the movement of the member when the current speed of the member is higher than or equal to a predetermined reference speed.

19. The input device according to claim 17,
wherein the controller is configured to alter a braking parameter for braking the movement of the member in response to the current speed, and cause the brake to brake the movement of the member using the altered braking parameter.

* * * * *